(12) United States Patent
Zhang

(10) Patent No.: US 11,974,692 B2
(45) Date of Patent: May 7, 2024

(54) STEAM-TYPE AIR FRYER

(71) Applicant: NINGBO CARELINE ELECTRIC APPLIANCE CO., LTD., Ningbo (CN)

(72) Inventor: Yichi Zhang, Ningbo (CN)

(73) Assignee: NINGBO CARELINE ELECTRIC APPLIANCE CO., LTD., Ningbo (CN)

( * ) Notice: Subject to any disclaimer, the term of this patent is extended or adjusted under 35 U.S.C. 154(b) by 667 days.

(21) Appl. No.: 17/105,626

(22) Filed: Nov. 26, 2020

(65) Prior Publication Data

US 2021/0298512 A1    Sep. 30, 2021

(30) Foreign Application Priority Data

Mar. 25, 2020   (CN) .......................... 202010219197.3
Mar. 25, 2020   (CN) .......................... 202020395385.7
Mar. 25, 2020   (CN) .......................... 202020395405.0
Mar. 25, 2020   (CN) .......................... 202020395410.1
Mar. 25, 2020   (CN) .......................... 202020396395.2
May 26, 2020    (CN) .......................... 202020902332.X

(51) Int. Cl.
*A47J 27/04* (2006.01)
*A47J 37/06* (2006.01)

(52) U.S. Cl.
CPC ........... *A47J 27/04* (2013.01); *A47J 37/0641* (2013.01); *A47J 2027/043* (2013.01)

(58) Field of Classification Search
CPC .......... A47J 27/004; A47J 27/05; A47J 37/06
See application file for complete search history.

(56) References Cited

U.S. PATENT DOCUMENTS

2013/0126514 A1* 5/2013 Cheung .................. A47J 27/04
126/369

OTHER PUBLICATIONS

CN 208300842 U (Year: 2019).*

* cited by examiner

*Primary Examiner* — Vy T Nguyen
(74) *Attorney, Agent, or Firm* — Bayramoglu Law Offices LLC

(57) ABSTRACT

A drain structure of an air fryer having a steaming function is provided. The air fryer includes a shell, a cooking cavity located at a lower side of the interior of the shell and a control cavity located at an upper side of the interior of the shell. The control cavity is provided therein with a control panel and a drive motor. The upper side of the shell is provided with a vent in communication with the control cavity. A top portion of the shell is provided with a water tank. The shell is provided therein with a steam generator in communication with the water tank. The steam generator is configured to input steam into the cooking cavity. The water tank is in a structure that is opened at bottom and closed at top, and the water tank is detachably mounted on the shell.

19 Claims, 13 Drawing Sheets

STEAM-TYPE AIR FRYER

CROSS-REFERENCE TO RELATED APPLICATIONS

The present disclosure claims the priority to the Chinese patent application with the filing number CN202010219197.3, filed on Mar. 25, 2020 with the Chinese Patent Office, and entitled "Drain Structure of Air Fryer Having Steaming Function", the Chinese patent application with the filing number CN202020902332.X, filed on May 26, 2020 with the Chinese Patent Office, and entitled "Air Fryer Having Good Sealing Property, the Chinese patent application with the filing number CN202020395385.7, filed on Mar. 25, 2020 with the Chinese Patent Office, and entitled "Cooking Cavity Sealing Structure of Air Fryer Having Steaming Function", the Chinese patent application with the filing number CN202020395405.0, filed on Mar. 25, 2020 with the Chinese Patent Office, and entitled "Door panel Sealing Structure of Air Fryer Having Steaming Function", the Chinese patent application with the filing number CN202020396395.2, filed on Mar. 25, 2020 with the Chinese Patent Office, and entitled "Waste Water Recovery System of Air Fryer Having Steaming Function", and the Chinese patent application with the filing number CN202020395410.1, filed on Mar. 25, 2020 with the Chinese Patent Office, and entitled "Condensate Water Recovery System of Air Fryer Having Steaming Function", the contents of which are incorporated herein by reference in entirety.

TECHNICAL FIELD

The present disclosure relates to the technical field of steam-type air fryers, and in particular, to a steam-type air fryer having a drain structure and a sealing structure.

BACKGROUND

The air fryer utilizes the high-speed air circulation technology, and generates high-temperature hot air in a pot body by quickly circulating hot air so as to form a crisp surface layer on the surface of food, and retain the moisture inside the food, thus achieving the fragrant and crisp mouthfeel of common fried food, moreover, less oil smoke is generated in the preparation process, therefore the air fryer is extremely popular with people.

As a common cooking appliance, currently some air fryers also have a steam cooking function. To realize steam cooking there must be a water tank. The existing air fryers with a steam function utilizes an upper water adding structure, and as an upper shell has an inlet hole, there is an overflow risk if the user adds water directly from the above, and water will flow into energized parts along the inlet hole of the upper shell, to cause safety problems such as electric shock and short circuit; moreover, some waste water may be produced after using the steam function, in the steam cooking process, food may be soaked by distilled water generated in the cooking cavity if the distilled water is not discharged in time, so that the sanitation problem occurs, and the distilled water also may remain at an air outlet on a side wall of the air fryer, therefore, the waste water needs to be treated in a centralized manner, that is to say, the condensate water in the cooking cavity and the waste water remaining in the water tank both need to be collected and discharged in time and cannot be left in place, thus a new and safe drain structure capable of collecting and discharging the waste water in time is needed.

The interior of the air fryer is usually divided into an upper control area and a lower cooking area by an air duct plate, and a motor and a control component are both located in the control area. A motor main shaft of the motor needs to penetrate through the air duct plate to be connected with a heat circulation wind wheel. A relatively large gap is reserved between the motor main shaft and the air duct plate of the existing air fryer, so as to avoid scraping interference between the motor main shaft and an air duct plate hole due to assembling errors, but this results in poor sealing property, and the risk of oil smoke pollution exists in the control area outside the air duct plate; when the air fryer having a steam function is provided with the bracket, there is no sealing structure between the air duct plate and the bracket, and between the bracket and the lower core of the existing air fryer, and small gaps exist. For the air fryer having the steam cooking function, these gaps may cause overflow of hot air and water steam during use, thus affecting the cooking effect; in addition, the existing air fryer having a steam function has no sealing structure at a door panel, but has a small gap, then steam will overflow in use. In order to address the shortcomings of the existing steam-type air fryer, an effective sealing structure is required so as to realize the sealing between the motor main shaft and the air duct plate, between the air duct plate and the bracket, between the bracket and the lower core, and at the door panel.

SUMMARY

A steam-type air fryer, including a shell, a cooking cavity located at a lower side of interior of the shell and a control cavity located at an upper side of the interior of the shell. The control cavity is provided therein with a control panel and a drive motor, and the upper side of the shell is provided with a vent (heat dissipation opening) in communication with the control cavity, wherein a top portion of the shell is provided with a water tank, the shell is provided therein with a steam generator in communication with the water tank, the steam generator is configured to input steam into the cooking cavity, the water tank is in a structure having an opened bottom and a closed top, and the water tank is detachably mounted on the shell.

BRIEF DESCRIPTION OF THE DRAWINGS

In order to more clearly illustrate technical solutions of embodiments of the present disclosure, accompanying drawings which need to be used in the embodiments will be introduced below briefly, and it should be understood that the accompanying drawings below merely show some embodiments of the present disclosure, and therefore should not be considered as limitation on the scope, and a person ordinarily skilled in the art still could obtain other relevant accompanying drawings according to these accompanying drawings, without using any inventive effort.

Figure 1:
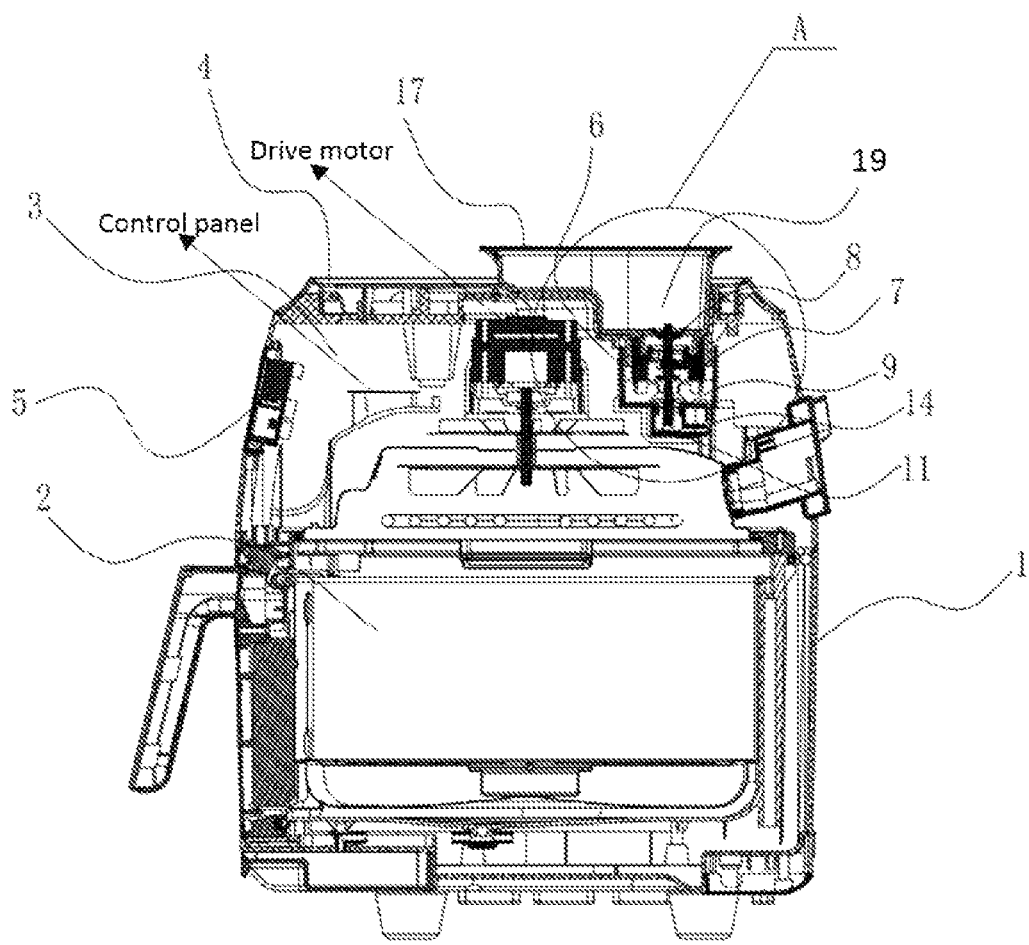
FIG. 1 is a front semi-sectional structural view of a steam-type air fryer provided in the present disclosure.

Reference Signs: 1. shell; 2. cooking cavity (cooking inner cavity); 3. control cavity; 4. vent; 5. steam generator; 6. secondary water tank; 7. water tank nut; 8. water tank rod; 9. ejector rod; 10. water outlet pipe; 11. waste water bin; 12. spring; 13. waste water sealing piece; 14. waste water outlet (waste water outlet); 15. concave notch; 16. nut sealing ring; 17. water tank upper cover; 18. water tank sealing piece; 19. water tank; 07. rear water receiving box; 08. air outlet assembly; 09. cooking cavity drain port (drain port); 010. water-through connector; 011. waste water tank; 002. inner pot body; 004. waste water tank detection sensor; 005. pot body detection sensor; 007. visible window; 101. motor rotating shaft; 102. cooling wind wheel; 103. flexible sleeve; 104. shaft sleeve; 105. bearing; 106. air duct plate; 107. heat circulation wind wheel; 108. mounting operation portion; 109. position-limiting part; 1010. spacer; 1011. nut; 1031. clamping groove; 1032. middle sleeve; 1033. sheet connecting portion; 201. lower core; 202. bracket; 204. silicone sealing ring; 205. convex pressing strip; 301. door panel; 302. door panel core; 303. sealing ring; 304. cover plate; 305. mounting groove; 307. core bracket; 308. positioning groove; 309. flange.

DETAILED DESCRIPTION OF THE EMBODIMENTS

In order to make objectives, technical solutions and advantages of the embodiments of the present disclosure clearer, the technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure described and shown in the accompanying drawings herein may be arranged and designed in different configurations.

Therefore, the detailed description below of the embodiments of the present disclosure provided in the accompanying drawings is not intended to limit the scope of protection of the present disclosure, but merely represents chosen embodiments of the present disclosure. Based on the embodiments of the present disclosure, all of other embodiments obtained by those ordinarily skilled in the art without using any creative effort shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that orientation or positional relationships indicated by terms such as "upper", "lower", "inner", and "outer" are based on orientation or positional relationships as shown in the accompanying drawings, or orientation or positional relationships of a product when being conventionally placed in use, merely for facilitating describing the present disclosure and simplifying the description, rather than indicating or suggesting that related devices or elements have to be in the specific orientation or configured and operated in a specific orientation, therefore, they should not be construed as limitation to the present disclosure. Besides, terms such as "first" and "second", if appear, are merely for distinctive description, but should not be construed as indicating or implying importance in the relativity.

Moreover, terms "horizontal", "vertical", and "overhanging" and the like do not mean that the parts are required to be absolutely horizontal or overhanging, but may be slightly inclined. For example, by "horizontal" it merely means that a structure is more horizontal in comparison with "vertical", rather than being completely horizontal, while the structure can be slightly inclined.

In the description of the present disclosure, it should be further illustrated that, unless otherwise specifically regulated and defined, the terms "provide", "mount", "link", and "connect" should be understood in a broad sense, for example, connection may be fixed connection, detachable connection, or integrated connection; it may be mechanical connection or electrical connection; it may be direct joining or indirect joining through an intermediary, and it also may be inner communication between two elements. For a person ordinarily skilled in the art, specific meanings of the above-mentioned terms in the present disclosure could be understood according to specific circumstances.

It should be noted that the features in the embodiments in the present disclosure may be combined with each other if there is no conflict.

A steam-type air fryer, including a shell, a cooking cavity located at a lower side of interior of the shell and a control cavity located at an upper side of the interior of the shell. The control cavity is provided therein with a control panel and a drive motor, and the upper side of the shell is provided with a vent (heat dissipation opening) in communication with the control cavity, wherein a top portion of the shell is provided with a water tank, the shell is provided therein with a steam generator in communication with the water tank, the steam generator is configured to input steam into the cooking cavity, the water tank is in a structure having an opened bottom and a closed top, and the water tank is detachably mounted on the shell.

In one or more embodiments, a bottom opening of the water tank is provided with a secondary water tank, the bottom opening of the water tank is detachably connected with a water tank nut extending into the inside of the secondary water tank, a water tank rod configured to be lifted up and down is provided in a middle part of the water tank nut, an upper end of the water tank rod is sheathed with a water tank sealing piece blocking a middle through hole of the water tank nut, a bottom of the secondary water tank is vertically provided with an ejector rod corresponding to the water tank rod, and when the ejector rod is against the water tank rod, the water tank sealing piece unblocks the middle through hole; when the water tank rod is separated from the ejector rod, the water tank sealing piece blocks the middle through hole; and a water outlet of the secondary water tank is in communication with the steam generator.

In one or more embodiments, the lower end of the secondary water tank is provided with a waste water bin in communication with a drain hole at the bottom of the secondary water tank, the ejector rod is vertically inserted from the drain hole and is externally sheathed with a spring against a bottom of the waste water bin, the ejector rod is externally sheathed with a waste water sealing piece blocking the drain hole, when the water tank rod is against the ejector rod, the waste water sealing piece blocks the drain hole; and when the water tank rod is separated from the ejector rod, the waste water sealing piece unblocks the drain hole.

In one or more embodiments, the waste water bin is provided with a waste water outlet at one side, and a bottom surface of the waste water bin is an inclined surface inclined towards the waste water outlet.

In one or more embodiments, a lower end surface of the water tank nut is provided with several concave notches around the circumference.

In one or more embodiments, a nut sealing ring is embedded between an upper end of the water tank nut and the water tank, and the upper end of the water tank is mounted with a water tank upper cover in a sealing manner.

In one or more embodiments, a waste water tank is mounted in the air fryer at the bottom, a cooking cavity drain port at the lower end of the cooking cavity is in communication with the waste water tank, and a waste water outlet at the lower end of the water tank is in communication with the waste water tank.

In one or more embodiments, a lower end of the cooking cavity drain port is mounted with a water-through connector in communication therewith, the waste water outlet of the water tank is connected to the water-through connector through a water pipe, and the water-through connector is in communication with the waste water tank.

In one or more embodiments, the air fryer is provided with an air outlet assembly at one side of an upper part, and the air outlet assembly is mounted with a rear water receiving box at a lower end.

In one or more embodiments, the bottom of the cooking cavity is in a structure with high periphery and low middle part, and the cooking cavity drain port is provided in the middle part of the bottom of the cooking cavity and is in communication with the waste water tank.

In one or more embodiments, the waste water tank and the air fryer are detachably connected.

In one or more embodiments, the waste water tank is provided with a visible window at one side, or the waste water tank is made of a transparent material.

In one or more embodiments, the air fryer further includes an air duct plate and a motor rotating shaft penetrating through a middle mounting hole of the air duct plate, wherein the motor rotating shaft is externally sheathed with a shaft sleeve, the shaft sleeve is externally sheathed with a bearing, an outer ring of the bearing is clamped into a flexible sleeve in a sealing manner, and the flexible sleeve is clamped into the middle mounting hole of the air duct plate in a sealing manner.

In one or more embodiments, the flexible sleeve is provided with a clamping groove at an outer side, and the clamping groove is clamped with the air duct plate.

In one or more embodiments, the flexible sleeve is provided with a middle sleeve in the middle, the bearing is provided in the middle sleeve, and a sheet connecting portion is provided between the middle sleeve and an edge of the flexible sleeve.

In one or more embodiments, the upper end of the shaft sleeve abuts against the cooling wind wheel at the upper side of the air duct plate, and the lower end of the shaft sleeve abuts against the heat circulation wind wheel at the lower side of the air duct plate.

In one or more embodiments, the motor rotating shaft at the upper side of the cooling wind wheel is sheathed with a position-limiting part, and the motor rotating shaft at the lower side of the heat circulation wind wheel is sheathed with a spacer and a nut in sequence.

In one or more embodiments, the cooking cavity includes a lower core, a bracket located at an upper end of the lower core and an air duct plate located at an upper end of the bracket, and a sealing structure is provided among the lower core, the bracket and the air duct plate.

In one or more embodiments, the shell of the air fryer is provided with a door frame opened towards one side, the door frame is in communication with the cooking cavity, a door body capable of opening or closing the door frame is provided at the door frame, the door body is provided with a sealing ring at one side facing the door frame, and the sealing ring is hermetically fitted with the door frame.

In one or more embodiments, a drawer-type frying basket is provided at the door frame, the drawer-type frying basket includes a food basket and a door panel core located at one side of the food basket, and the door panel core is provided with the sealing ring.

A drain structure of an air fryer having a steaming function is disclosed. The air fryer includes a shell, a cooking cavity located at a lower side of the interior of the shell and a control cavity located at an upper side of the interior of the shell. The control cavity is provided therein with a control panel and a drive motor, the upper side of the shell is provided with a vent in communication with the control cavity, wherein a top portion of the shell is provided with a water tank, the shell is provided therein with a steam generator in communication with the water tank, the steam generator is configured to input steam into the cooking cavity, the water tank is in a structure having an opened bottom and a closed top, and the water tank is detachably mounted on the shell.

In one or more embodiments, an upper end of the air fryer is mounted with the water tank in an embedding manner. A bottom opening of the water tank is provided with a secondary water tank. The bottom opening of the water tank is detachably connected with a water tank nut located inside the secondary water tank. A water tank rod configured to be lifted up and down is provided in a middle part of the water tank nut. An upper end of the water tank rod is sheathed with a water tank sealing piece blocking a middle through hole of the water tank nut. The bottom of the secondary water tank is vertically provided with an ejector rod against the water tank rod.

In one or more embodiments, a lower end of one side of the secondary water tank is provided with a water outlet pipe connected to a water pump.

In one or more embodiments, the lower end of the secondary water tank is provided with a waste water bin in communication with a drain hole at the bottom of the secondary water tank, the ejector rod is vertically inserted from the drain hole and is externally sheathed with a spring against the bottom of the waste water bin. The ejector rod is externally sheathed with a waste water sealing piece blocking the drain hole. The waste water bin is provided with a waste water outlet at one side.

In one or more embodiments, the lower part of the water tank rod is externally sheathed with a spring whose upper end is against a lower end of the water tank nut.

In one or more embodiments, a lower end surface of the water tank nut is uniformly provided with several concave notches around the circumference.

In one or more embodiments, a nut sealing ring is embedded between the upper end of the water tank nut and the water tank.

In one or more embodiments, the upper end of the water tank is hermetically mounted with a water tank upper cover.

In one or more embodiments, a bottom surface of the waste water bin is an inclined surface inclined towards the waste water outlet.

In one or more embodiments, the water tank nut and the water tank are in threaded connection.

An air fryer having good sealing property, including an air duct plate and a motor rotating shaft penetrating through a middle mounting hole of the air duct plate, wherein the motor rotating shaft is externally sheathed with a shaft sleeve, the shaft sleeve is externally sheathed with a bearing, an outer ring of the bearing is clamped into a flexible sleeve in a sealing manner, and the flexible sleeve is clamped into the middle mounting hole of the air duct plate in a sealing manner.

In one or more embodiments, the flexible sleeve is provided with a clamping groove at an outer side, and the clamping groove is clamped with the air duct plate.

In one or more embodiments, the flexible sleeve is provided with a middle sleeve in the middle, and the bearing is provided in the middle sleeve.

In one or more embodiments, a sheet connecting portion is provided between the middle sleeve and an edge of the flexible sleeve.

In one or more embodiments, the shaft sleeve and the motor rotating shaft are in threaded connection therebetween.

In one or more embodiments, the shaft sleeve is provided with a mounting operation portion at an upper end.

In one or more embodiments, the upper end of the shaft sleeve abuts against the cooling wind wheel at the upper side of the air duct plate, and the lower end of the shaft sleeve abuts against the heat circulation wind wheel at the lower side of the air duct plate.

In one or more embodiments, the motor rotating shaft at the upper side of the cooling wind wheel is sheathed with a position-limiting part In one or more embodiments, the motor rotating shaft at the lower side of the heat circulation wind wheel is sheathed with a spacer and a nut in sequence.

A cooking cavity sealing structure of an air fryer having a steaming function, wherein a steam generation assembly and a cooking cavity are provided in a shell of the air fryer, the cooking cavity is provided with a steam inlet in communication with the steam generation assembly, and the cooking cavity is formed by splicing at least two parts, and a sealing structure is provided at a splicing position.

In one or more embodiments, the cooking cavity includes a lower core, a bracket located at an upper end of the lower core and an air duct plate located at an upper end of the bracket, and a sealing structure is provided among the lower core, the bracket and the air duct plate.

In one or more embodiments, the cooking cavity includes a lower core and an air duct plate located at an upper side of the lower core, a sealing structure is provided between the lower core and the air duct plate.

In one or more embodiments, the sealing structure includes a sealing member provided in any splicing portion of the cooking cavity, and a compression structure provided on adjacent splicing portion for compressing the sealing member.

In one or more embodiments, the sealing member is provided in the sealing grooves.

In one or more embodiments, the compression structure is a convex pressing strip.

In one or more embodiments, the sealing member is a silicone sealing ring.

In one or more embodiments, the silicone sealing ring is a hollow silicone sealing ring.

A door panel sealing structure of an air fryer having a steaming function is disclosed. A shell of the air fryer is provided with a door frame opened towards one side, a door body that may open or close the door frame is provided at the door frame, wherein a steam generation assembly and the cooking cavity are provided in the shell of the air fryer, the cooking cavity is provided with a steam inlet in communication with the steam generation assembly, the cooking cavity is open at one side to be in communication with the door frame, the door body is provided with a sealing ring at one side facing the door frame, and the sealing ring is hermetically fitted with the door frame.

In one or more embodiments, the door body includes the door panel and a door panel core, the door panel is mounted on the outer side of the door panel core, a cover plate is mounted on the inner side of the door panel core, and the inner side of the door panel core is arranged with a sealing ring around an edge of the cover plate.

In one or more embodiments, an inner side of the door panel core is provided with a mounting groove in an annular shape around an edge of the cover plate. One end of the sealing ring extends into the mounting groove and is tightly compressed by the cover plate, and the other end of the sealing ring extends out of the mounting groove and is curved outwards in an arc shape.

In one or more embodiments, one end of the sealing ring extending into the mounting groove is provided with a positioning groove at the side thereof close to the cover plate, and the cover plate is provided with a flange extending into the positioning groove.

In one or more embodiments, the sealing ring is a silicone ring.

In one or more embodiments, the door panel core and the door panel are fixed to each other by screws.

In one or more embodiments, the door panel core and the cover plate are fixed to each other by screws.

In one or more embodiments, the air fryer is provided with a lower core in a lower portion, a core bracket is above the lower core, the cooking cavity is located between the core bracket and the lower core, and the lower core and the core bracket in cooperation form the door frame of the air fryer.

A waste water recovery system of the air fryer having a steaming function. A steam generation assembly and the cooking cavity are provided in a shell of the air fryer, the cooking cavity is provided with a steam inlet in communication with the steam generation assembly, the shell of the air fryer is provided with the water tank, the water tank and the steam generation assembly are in communication with the cooking cavity, wherein a waste water tank is mounted in the air fryer at the bottom, a cooking cavity drain port at the lower end of the cooking cavity is in communication with the waste water tank, and a waste water outlet at the lower end of the water tank is in communication with the waste water tank.

In one or more embodiments, a lower end of the cooking cavity drain port is mounted with a water-through connector in communication therewith, the waste water outlet of the water tank is connected to the water-through connector through a water pipe, and the water-through connector is in communication with the waste water tank.

In one or more embodiments, the air fryer is provided with an air outlet assembly at one side of an upper part, and the air outlet assembly is mounted with a rear water receiving box at a lower end.

In one or more embodiments, the bottom of the cooking cavity is in a structure with high periphery and low middle part, and the cooking cavity drain port is located in the middle part of the cooking cavity.

In one or more embodiments, the waste water tank is provided with a visible window at one side.

In one or more embodiments, the water-through connector is a three-way connector.

In one or more embodiments, the water tank includes a main water tank and a secondary water tank mounted at a lower end of the main water tank. The secondary water tank is provided with a waste water bin at a lower end. The waste water bin is provided with a waste water outlet at one side.

In one or more embodiments, the secondary water tank is provided with an excess water drain port in an upper part, and this excess water drain port is in communication with the waste water tank through a hose.

In one or more embodiments, the rear water receiving box is made of a transparent material, and is detachably connected to the air outlet assembly.

In one or more embodiments, the waste water tank and the air fryer are detachably connected.

A condensate water recovery system of an air fryer having a steaming function. The steam generation assembly and the cooking inner cavity are provided in the shell of the air fryer, the cooking inner cavity is provided with a steam inlet in communication with the steam generation assembly, wherein the air fryer is provided with the waste water tank at the bottom, the cooking inner cavity is provided with the drain port at a lower end, the bottom of the cooking inner cavity is in a structure with high periphery and low middle part, and the drain port is provided in the middle part of the bottom of the cooking inner cavity and is in communication with the waste water tank.

In one or more embodiments, the waste water tank and the air fryer are detachably connected.

In one or more embodiments, an inner side of the bottom of the air fryer is provided with an inner chute, and the waste water tank slides along the inner chute so as to realize detachment and mounting.

In one or more embodiments, the air fryer is mounted, at one side of the bottom, with a waste water tank detection sensor.

In one or more embodiments, the waste water tank is provided with the visible window at one side.

In one or more embodiments, a pot body detection sensor is mounted inside the cooking inner cavity at one side.

The present disclosure provides a drain structure of an air fryer having a steaming function. The air fryer includes a shell, a cooking cavity located at a lower side of the interior of the shell and a control cavity located at an upper side of the interior of the shell, the control cavity is provided therein with a control panel and a drive motor, the upper side of the shell is provided with a vent in communication with the control cavity, a top portion of the shell is provided with a water tank, the shell is provided therein with a steam generator in communication with the water tank, the steam generator is configured to input steam into the cooking cavity, the water tank is in a structure having an opened bottom and a closed top, and the water tank is detachably mounted on the shell.

An upper end of the air fryer is mounted with the water tank in an embedding manner. A bottom opening of the water tank is provided with a secondary water tank. The bottom opening of the water tank is detachably connected with a water tank nut located inside the secondary water tank. A water tank rod configured to be lifted up and down is provided in a middle part of the water tank nut. An upper end of the water tank rod is sheathed with a water tank sealing piece blocking a middle through hole of the water tank nut. The bottom of the secondary water tank is vertically provided with an ejector rod against the water tank rod.

A lower end of one side of the secondary water tank is provided with a water outlet pipe connected to a water pump.

The lower end of the secondary water tank is provided with a waste water bin in communication with a drain hole at the bottom of the secondary water tank, the ejector rod is vertically inserted from the drain hole and is externally sheathed with a spring against the bottom of the waste water bin. The ejector rod is externally sheathed with a waste water sealing piece blocking the drain hole. The waste water bin is provided with a waste water outlet at one side.

In one or more embodiments, the lower part of the water tank rod is externally sheathed with a spring whose upper end is against a lower end of the water tank nut, then automatic reset of the water tank rod may be realized.

In one or more embodiments, a lower end surface of the water tank nut is uniformly provided with several concave notches around the circumference, then external air may enter conveniently, and the water level in the secondary water tank may be limited by the depth of the concave notches.

In one or more embodiments, a nut sealing ring is embedded between the upper end of the water tank nut and the water tank to improve the sealing effect.

In one or more embodiments, the upper end of the water tank is hermetically mounted with a water tank upper cover, and the water tank upper cover has a good sealing effect with the water tank, thus ensuring that the water tank will not leak water when being filled with water.

In one or more embodiments, a bottom surface of the waste water bin is an inclined surface inclined towards the waste water outlet, thus it may be ensured that water in the waste water bin may flow out from the waste water outlet.

In one or more embodiments, when adding water, the water tank needs to be removed. The water tank upper cover and the water tank are completely sealed. After the water tank is filled up with water, the water tank nut is screwed, and the water tank nut and the water tank are sealed by the nut sealing ring.

In one or more embodiments, the water tank nut and the water tank are in threaded connection.

When the water tank is taken out, the action of the spring causes the water tank rod and the water tank sealing piece to block a drain port, at this time, water will not flow out, and when the water tank is placed in an upper position of the air fryer, the water tank rod is jacked up by the ejector rod, then the drain port is opened, the water starts to flow into the secondary water tank, and the water level begins to increase. The air enters the drain port from the concave notches at the lower end of the water tank nut so as to supplement the air in the water tank. However, when liquid level is increased to the position of the concave notches, air cannot enter the water tank, thus forming a liquid sealing effect, the interior of the water tank is in a negative pressure, then the water no longer falls into the secondary water tank, and the liquid level of the secondary water tank is no longer increased.

When the water tank is removed, the waste water sealing piece is jacked up and opened, and residual water in the secondary water tank will enter the waste water bin and flow into another waste water collecting box through the waste water outlet, thus ensuring that there is no accumulated water in the secondary water tank to affect the sanitation.

In one or more embodiments, in a waste water recovery system of the air fryer having a steaming function provided in the present disclosure, a steam generation assembly and the cooking cavity are provided in the shell of the air fryer, the cooking cavity is provided with a steam inlet in communication with the steam generation assembly, the shell of the air fryer is provided with the water tank, the water tank and the steam generation assembly are in communication with the cooking cavity, a waste water tank is mounted in the air fryer at the bottom, a cooking cavity drain port at the lower end of the cooking cavity is in communication with the waste water tank, and a waste water outlet at the lower end of the water tank is in communication with the waste water tank.

In one or more embodiments, a lower end of the cooking cavity drain port is mounted with a water-through connector in communication therewith, the waste water outlet of the water tank is connected to the water-through connector through a water pipe, and the water-through connector is in communication with the waste water tank.

In one or more embodiments, the air fryer is provided with an air outlet assembly at one side of an upper part, and the air outlet assembly is mounted with a rear water receiving box at a lower end.

In one or more embodiments, the bottom of the cooking cavity is in a structure with high periphery and low middle part, and the cooking cavity drain port is located in the middle part of the cooking cavity, so as to facilitate the accumulated water gathering towards the cooking cavity drain port.

In one or more embodiments, the waste water tank is provided with a visible window at one side, and through the visible window the water level of the waste water in the waste water tank may be seen, thus facilitating cleaning.

In one or more embodiments, the water-through connector is a three-way connector, and may be in communication and connection with the cooking cavity drain port, the waste water outlet and the waste water tank simultaneously, which is quite convenient.

In one or more embodiments, the water tank includes a main water tank and a secondary water tank mounted at a lower end of the main water tank. The secondary water tank is provided with a waste water bin at a lower end. The waste water bin is provided with a waste water outlet at one side. Most residual water may remain in the secondary water tank. The water tank may be removed to exchange water, and the remaining waste water may automatically flow into the waste water bin, further ensuring the cleanness and sanitation in the secondary water tank.

In one or more embodiments, the secondary water tank is provided with an excess water drain port in an upper part, and this excess water drain port is in communication with the waste water tank through a hose. When the water in the secondary water tank is excessive, the water will automatically flow back into the waste water tank.

In one or more embodiments, the rear water receiving box is made of a transparent material, and is detachably connected to the air outlet assembly, which facilitates observation and cleaning in time.

In one or more embodiments, the waste water tank and the air fryer are detachably connected, and specifically, similar to a drawer, the waste water tank may be inserted in a manner of translation from one side of the air fryer at the bottom.

In one or more embodiments, in a condensate water recovery system of the air fryer having a steaming function provided in the present disclosure, the steam generation assembly and the cooking inner cavity are provided in the shell of the air fryer, the cooking inner cavity is provided with a steam inlet in communication with the steam generation assembly, the air fryer is provided with the waste water tank at the bottom, the cooking inner cavity is provided with the drain port at a lower end, the bottom of the cooking inner cavity is in a structure with high periphery and low middle part, and the drain port is provided in the middle part of the bottom of the cooking inner cavity and is in communication with the waste water tank.

The bottom of the inner cavity is in a structure with high periphery and low middle part, then condensate water in the inner cavity may automatically flow to the position of the drain port, and enter the waste water tank, thus realizing automatic collection.

In order to facilitate emptying the waste water in the waste water tank, the waste water tank and the air fryer are detachably connected.

In one or more embodiments, an inner side of the bottom of the air fryer is provided with an inner chute, and the waste water tank slides along the inner chute so as to realize detachment and mounting, in this way the mounting and detachment of the waste water tank may be realized quickly.

In one or more embodiments, the air fryer is mounted, at one side of the bottom, with a waste water tank detection sensor which may detect whether the waste water tank is mounted in position, and which will issue a prompt if the waste water tank is not mounted in position, and the air fryer cannot be started.

In one or more embodiments, the waste water tank is provided with the visible window at one side, and through the visible window the water level in the waste water tank may be seen, so as to empty the waste water tank in time.

In one or more embodiments, likewise, a pot body detection sensor is mounted inside the inner cavity at one side, and may detect whether an inner pot body is placed in position.

The present disclosure provides a steam-type air fryer, further including sealing structures, wherein the sealing structures include a sealing structure between a motor rotating shaft and an air duct plate, a cooking cavity sealing structure and a door panel sealing structure.

For the sealing structure between the motor rotating shaft and the air duct plate, the steam-type air fryer provided in the present disclosure includes an air duct plate and a motor rotating shaft penetrating through a middle mounting hole of the air duct plate, the motor rotating shaft is externally sheathed with a shaft sleeve, the shaft sleeve is externally sheathed with a bearing, an outer ring of the bearing is clamped into a flexible sleeve, the flexible sleeve is clamped into the middle mounting hole of the air duct plate.

In one or more embodiments, the flexible sleeve is provided with a clamping groove at an outer side, the clamping groove is clamped with the air duct plate directly, without other fasteners for mounting, which is quite convenient, and does not require high mounting accuracy.

In one or more embodiments, the flexible sleeve is provided with a middle sleeve in the middle, the bearing is provided in the middle sleeve, and the middle sleeve wraps the bearing, then the bearing can be effectively positioned, and the sealing property of the flexible sleeve can be improved.

In one or more embodiments, a sheet connecting portion is provided between the middle sleeve and an edge of the flexible sleeve, and the sheet connecting portion may enhance the elasticity thereof, and may ensure an easier operation in the assembling process, and meanwhile, having better elasticity will not affect operation of a motor shaft in the operation process of the product.

In one or more embodiments, the shaft sleeve and the motor rotating shaft adopt threaded connection therebetween, then the mounting is solid and reliable.

In one or more embodiments, the shaft sleeve is provided with a mounting operation portion at an upper end, and the mounting operation portion functions to make a tool have a force-bearing part so as to facilitate mounting the shaft sleeve.

In one or more embodiments, the upper end of the shaft sleeve abuts against the cooling wind wheel at the upper side of the air duct plate, the lower end of the shaft sleeve abuts against the heat circulation wind wheel at the lower side of the air duct plate, then the cooling wind wheel and the heat circulation wind wheel may be positioned by the shaft sleeve to facilitate assembling.

In one or more embodiments, the motor rotating shaft at the upper side of the cooling wind wheel is sheathed with a position-limiting part, the position-limiting part and the shaft sleeve together may clamp the cooling wind wheel, resulting in solid positioning.

In one or more embodiments, the motor rotating shaft at the lower side of the heat circulation wind wheel is sheathed with a spacer and a nut in sequence, then the spacer and the nut can ensure the positioning and mounting of the heat circulation wind wheel.

For the cooking cavity sealing structure, a steam generation assembly and a cooking cavity are provided in the shell of the air fryer, the cooking cavity is provided with a steam inlet in communication with the steam generation assembly, and the cooking cavity is formed by splicing at least two parts, and a sealing structure is provided at a splicing position.

In one or more embodiments, the cooking cavity includes a lower core, a bracket located at an upper end of the lower core and an air duct plate located at an upper end of the bracket, and a sealing structure is provided between the lower core, the bracket and the air duct plate, in this way, both splicing positions may be sealed, and the steam in the cooking cavity is prevented from leaking outwards.

In one or more embodiments, the cooking cavity includes a lower core and an air duct plate located at an upper side of the lower core, a sealing structure is provided between the lower core and the air duct plate, which likewise may effectively prevent the steam in the cooking cavity from leaking outwards.

In one or more embodiments, the sealing structure includes a sealing member provided in any splicing portion of the cooking cavity, and a compression structure provided on adjacent splicing portions for compressing the sealing member, and the compression structure may improve the sealing effect of the sealing member.

In one or more embodiments, the sealing member is provided in the sealing grooves, to effectively position the sealing member, and prevent the sealing member from moving, thus ensuring the sealing property.

In one or more embodiments, the compression structure is a convex pressing strip, and the convex pressing strip is correspondingly pressed against the sealing member, thereby ensuring that any position of the sealing member is tightly compressed, and ensuring the sealing property.

In one or more embodiments, the sealing member is a silicone sealing ring. The silicone sealing ring is relatively common, with a relatively low cost, and relatively convenient to replace.

In one or more embodiments, the silicone sealing ring is a hollow silicone sealing ring. The hollow silicone sealing ring has very good elasticity and a long service life.

For the door panel sealing structure, the shell of the air fryer is provided with a door frame opened towards one side, a door body that may open or close the door frame is provided at the door frame, a steam generation assembly and the cooking cavity are provided in the shell of the air fryer, the cooking cavity is provided with a steam inlet in communication with the steam generation assembly, the cooking cavity is open at one side to be in communication with the door frame, and the door body is provided with a sealing ring at one side facing the door frame, the sealing ring is hermetically fitted with the door frame, so as to ensure that the hot air and the water steam do not leak outwards from connection parts of the door panel.

In one or more embodiments, the door body includes the door panel and a door panel core, the door panel is mounted on the outer side of the door panel core, a cover plate is mounted on the inner side of the door panel core, and the inner side of the door panel core is arranged with a sealing ring around an edge of the cover plate.

In one or more embodiments, an inner side of the door panel core is provided with a mounting groove in an annular shape around an edge of the cover plate. One end of the sealing ring extends into the mounting groove and is tightly compressed by the cover plate, and the other end of the sealing ring extends out of the mounting groove and is curved outwards in an arc shape. One end of the sealing ring extending out of the mounting groove is a sealing tongue portion, and the sealing tongue portion is sealed against the door frame.

In one or more embodiments, one end of the sealing ring extending into the mounting groove is provided with a positioning groove at the side thereof close to the cover plate, and the cover plate is provided with a flange extending into the positioning groove. One end of the sealing ring extending into the mounting groove is a fixing portion, and the positioning groove in the fixing portion is fitted with the flange on the cover plate, then the sealing ring can be effectively positioned and tightly compressed, thereby reducing the shaking of the sealing ring.

In one or more embodiments, the sealing ring is a silicone ring.

In one or more embodiments, the door panel core and the door panel are fixed by screws.

In one or more embodiments, the door panel core and the cover plate are fixed by screws.

In one or more embodiments, the air fryer is provided with a lower core in a lower portion, a core bracket is above the lower core, the cooking cavity is located between the core bracket and the lower core, and the lower core and the core bracket in cooperation form the door frame of the air fryer.

Compared with the prior art, the beneficial effects of the steam-type air fryer provided in the present disclosure are as follows.

The drain structure of the steam-type air fryer provided in the present disclosure has a simple and unique structure, the water tank needs to be removed, and the water tank nut needs to be unscrewed to add water, which effectively prevents the risk of water overflow, and prevents water from flowing into the control cavity when adding water which affects the service life of the electric device. The water tank nut has a certain height, and when the liquid level of the secondary water tank is increased to this height, air cannot enter the water tank, thus forming the liquid sealing effect, the interior of the water tank is in a negative pressure, then the water no longer falls into the secondary water tank, and the liquid level of the secondary water tank is no longer increased, therefore the sealing effect is good; the ejector rod and the water tank rod cooperate with each other to realize the automatic drain and automatic sealing of the water tank, and also have a function of cleaning waste water to prevent waste water from remaining; the water remaining in the water tank may be discharged into the waste water tank to avoid the water in the water tank from being contaminated to affect the steam quality; the distilled water generated in the cooking cavity in the steam cooking process may be discharged into the water receiving box, so as to avoid the food from being soaked by the distilled water; the rear water receiving box provided below a steam outlet may collect the condensate water generated by the steam discharged, thereby solving the problem of collecting the waste water inside the air fryer, which is safe and sanitary; moreover, the bottom wall of the inner cavity of the cooking cavity is in a structure with high periphery and low middle part, then the condensate water will gather towards the middle of the bottom wall of the inner cavity, and flow into the waste water tank through a condensate water outlet in the middle, then the food will not be soaked by the accumulated water and the mouthfeel will not be affected. The water level of the waste water tank is visible, facilitating the user in observing and cleaning the waste water tank in time, thus functioning to detect whether the waste water tank is mounted or not, and avoiding the situation that the air fryer is used without mounting the waste water tank, thereby improving the user's use experience.

The sealing structure between the motor rotating shaft and the air duct plate of the steam-type air fryer provided in the present disclosure realizes the sealing against the mounting hole of the air duct plate by adopting the combination of the shaft sleeve, the bearing and the flexible sleeve. The flexible sleeve has certain elasticity, may be deformed and easily assembled, and may ensure that the assembling will not be affected even if an assembling error exists, moreover, vibration of motor rotating shaft, fan and the like will not affect the sealing, either; and the shaft sleeve further may position the positions of the cooling wind wheel and the heat circulation wind wheel, thus facilitating the assembling.

The cooking cavity sealing structure of the steam-type air fryer provided in the present disclosure has a simple structure, and may ensure the sealing property among the components constituting the cooking inner cavity of the air fryer, avoid steam leakage, with a reasonable sealing structure, and improve the sealing property by providing the compression structure.

For the door panel sealing structure of the steam-type air fryer provided in the present disclosure, the mounting groove is added on the door panel core, and the sealing ring is placed in the mounting groove and pressed by the cover plate; when the entire door panel assembly (including the pot body) is placed in the frying pot, the sealing ring is in close contact with the door frame of the frying pot, thereby preventing overflow of hot air and water steam, and realizing the sealing effect; one end of the sealing ring extending out of the mounting groove is a sealing tongue portion, and the sealing tongue portion is sealed against the door frame; one end of the sealing ring extending into the mounting groove is a fixing portion, and the positioning groove in the fixing portion is fitted with the flange on the cover plate, then the sealing ring can be effectively positioned and tightly compressed, thereby reducing the shaking of the sealing ring.

The embodiments of the present disclosure are further described below in detail with reference to the accompanying drawings.

Figure 2:
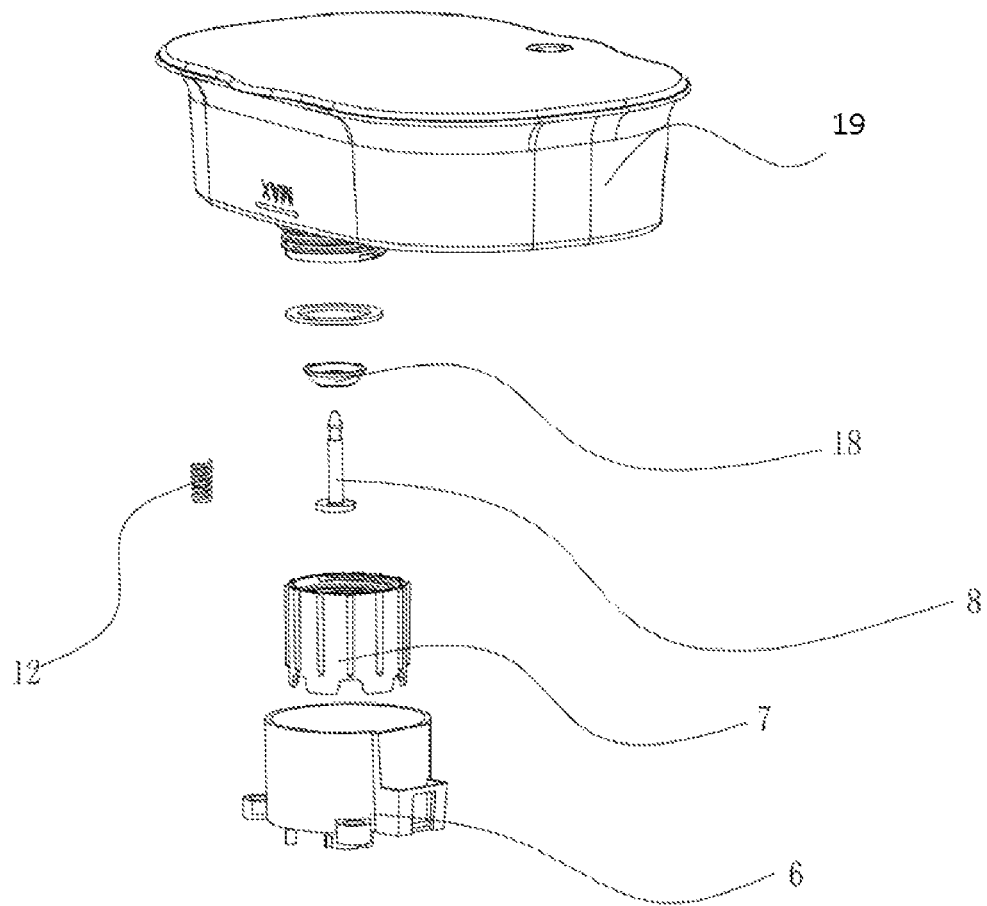
FIG. 2 is a partial perspective exploded structural view of the steam-type air fryer provided in the present disclosure.
Figure 3:
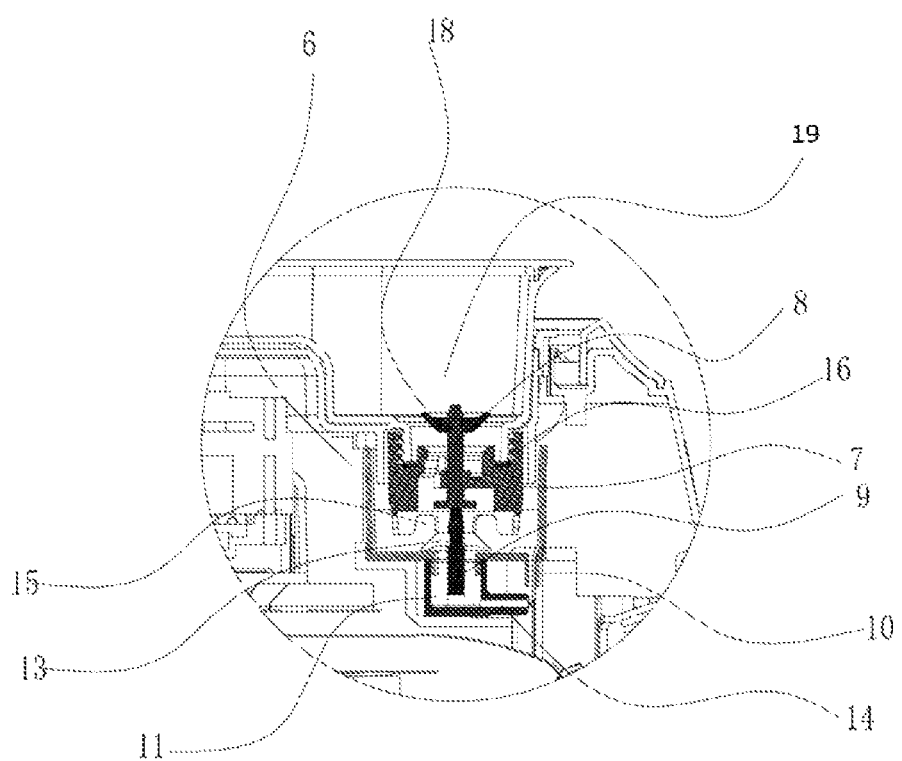
FIG. 3 is an enlarged structural view of a place A in FIG. 1.

As shown in FIGS. 1-3, the present disclosure provides a drain structure of an air fryer having a steaming function. The air fryer includes a shell 1, a cooking cavity 2 located at a lower side of the interior of the shell 1 and a control cavity 3 located at an upper side of the interior of the shell 1, the control cavity 3 is provided therein with a control panel and a drive motor, the upper side of the shell 1 is provided with a vent 4 in communication with the control cavity 3, a top portion of the shell 1 is provided with a water tank 19, the shell 1 is provided therein with a steam generator 5 in communication with the water tank 19, the steam generator 5 is configured to input steam into the cooking cavity 2, the water tank 19 is in a structure having an opened bottom and a closed top, and the water tank 19 is detachably buckled on the shell 1.

An upper end of the air fryer is mounted with the water tank 19 in an embedding manner. A bottom opening of the water tank 19 is provided with a secondary water tank 6. The bottom opening of the water tank 19 is detachably connected with a water tank nut 7 located inside the secondary water tank 6. A water tank rod 8 configured to be lifted up and down is provided in a middle part of the water tank nut 7. An upper end of the water tank rod 8 is sheathed with a water tank sealing piece 18 blocking a middle through hole of the water tank nut 7. The bottom of the secondary water tank 6 is vertically provided with an ejector rod 9 against the water tank rod 8. A lower end of one side of the secondary water tank 6 is provided with a water outlet pipe 10 connected to a water pump.

The lower end of the secondary water tank 6 is provided with a waste water bin 11 in communication with a drain hole at the bottom of the secondary water tank 6, the ejector rod 9 is vertically inserted from the drain hole and is externally sheathed with a spring 12 against the bottom of the waste water bin 11. The ejector rod 9 is externally sheathed with a waste water sealing piece 13 blocking the drain hole. The waste water bin 11 is provided with a waste water outlet 14 at one side.

The lower part of the water tank rod 8 is externally sheathed with a spring 12 whose upper end is against a lower end of the water tank nut 7, then automatic reset of the water tank rod 8 may be realized.

A lower end surface of the water tank nut 7 is uniformly provided with several concave notches 15 around the circumference, then external air may enter conveniently, and the water level in the secondary water tank 5 may be limited by the depth of the concave notches 15.

A nut sealing ring 16 is embedded between the upper end of the water tank nut 7 and the water tank 19 to improve the sealing effect.

The upper end of the water tank 19 is hermetically mounted with a water tank upper cover 17, and the water tank upper cover 17 has a good sealing effect with the water tank 19, thus ensuring that the water tank will not leak water when being filled with water.

A bottom surface of the waste water bin 11 is an inclined surface inclined towards the waste water outlet 14, thus it may be ensured that water in the waste water bin 11 may flow out from the waste water outlet 14.

As an embodiment of the present disclosure, when adding water, the water tank 19 needs to be removed. The water tank nut 7 is threaded to the water tank 19, and the water tank nut 7 is unscrewed to add water. The water tank upper cover 17 and the water tank 19 are completely sealed. After the water tank 19 is filled up with water, the water tank nut 7 is screwed, and the water tank nut 7 and the water tank 19 are sealed by the nut sealing ring 16.

When the water tank 19 is taken out, the action of the spring 12 causes the water tank rod 8 and the water tank sealing piece 18 to block a drain port, at this time, water will not flow out, and when the water tank 19 is placed in an upper position of the air fryer, the water tank rod 8 is jacked up by the ejector rod 9, then the drain port is opened, the water starts to flow into the secondary water tank 6, and the water level begins to increase. The air enters the drain port from the concave notches 15 at the lower end of the water tank nut 7 so as to supplement the air in the water tank 19. However, when liquid level is increased to the position of the concave notches 15, air cannot enter the water tank 19, thus forming a liquid sealing effect, and the interior of the water tank 19 is in a negative pressure, then the water no longer falls into the secondary water tank 6, and the liquid level of the secondary water tank 6 is no longer increased.

When the water tank 19 is removed, the waste water sealing piece 13 is jacked up and opened, and residual water in the secondary water tank 6 will enter the waste water bin 11 and flow into another waste water collecting box through the waste water outlet 14, thus ensuring that there is no accumulated water in the secondary water tank 6 to affect the sanitation.

It can be seen that for the drain structure of the present disclosure, the water tank needs to be removed for adding water, thereby effectively preventing the risk of water overflow, and preventing the water from entering the control cavity 3.

Figure 4:
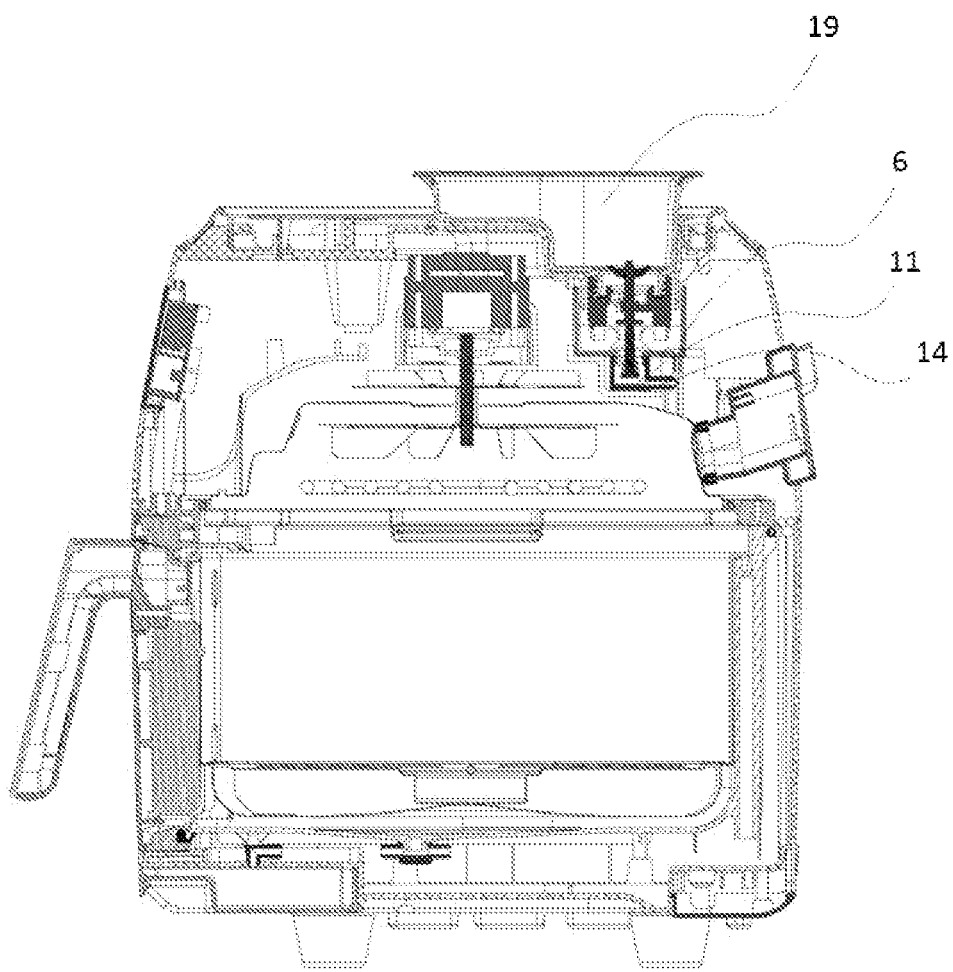
FIG. 4 is a front semi-sectional structural view of the steam-type air fryer provided in the present disclosure.
Figure 5:
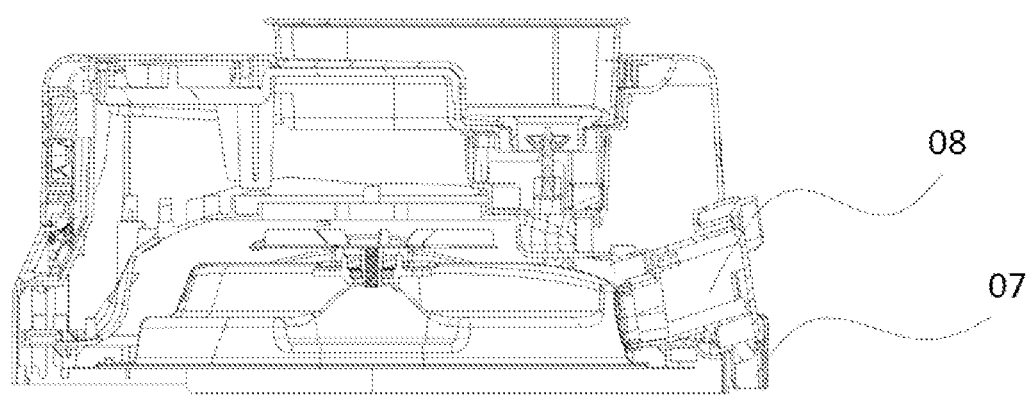
FIG. 5 is a partial semi-sectional structural view of the steam-type air fryer provided in the present disclosure.
Figure 6:
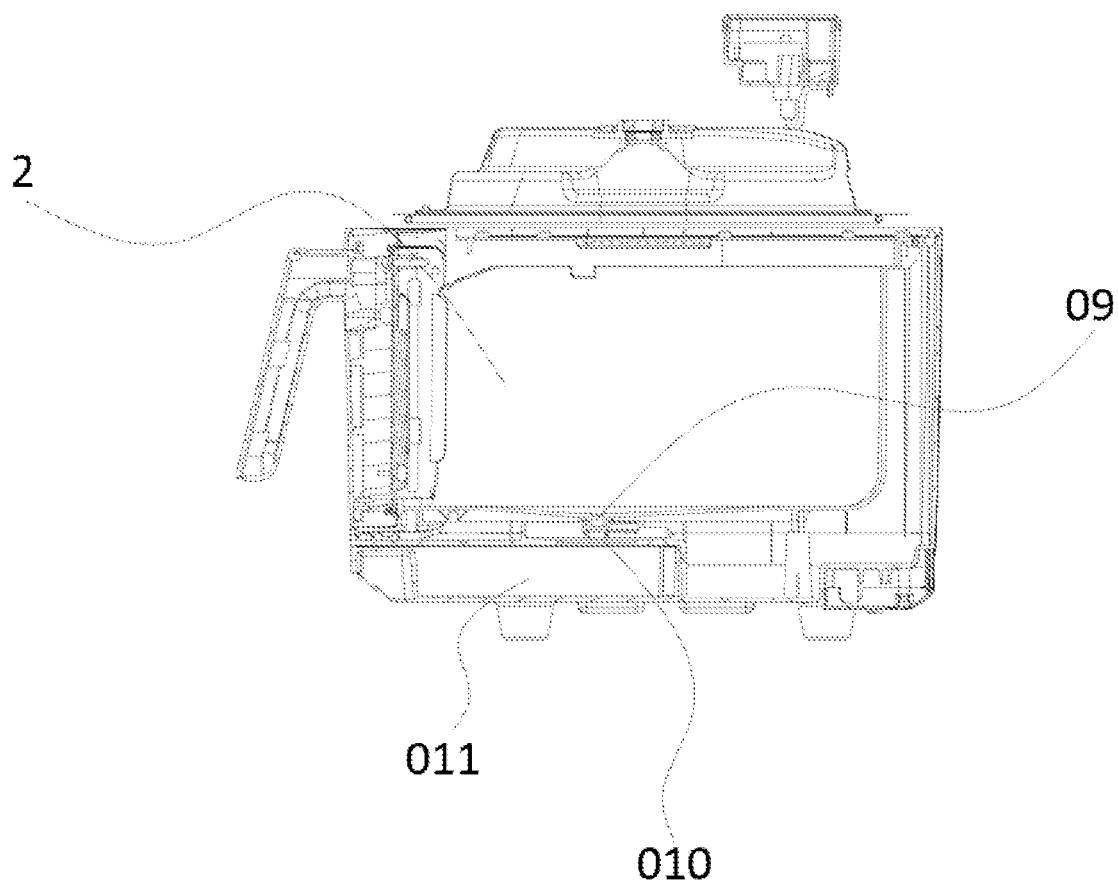
FIG. 6 is a partial semi-sectional structural view of the steam-type air fryer provided in the present disclosure.

As shown in FIGS. 4-6, in a waste water recovery system of the air fryer having a steaming function provided in the present disclosure, a steam generation assembly and the cooking cavity 2 are provided in the shell of the air fryer, the cooking cavity 2 is provided with a steam inlet in communication with the steam generation assembly, the shell of the air fryer is provided with the water tank 19, the water tank 19 and the steam generation assembly are in communication with the cooking cavity 2, a waste water tank 011 is mounted in the air fryer at the bottom, a cooking cavity drain port 09 at the lower end of the cooking cavity 2 is in communication with the waste water tank 011, and a waste water outlet at the lower end of the water tank 19 is in communication with the waste water tank 011.

A lower end of the cooking cavity drain port 09 is mounted with a water-through connector 010 in communication therewith, the waste water outlet 14 of the water tank 19 is connected to the water-through connector 010 through a water pipe, and the water-through connector 010 is in communication with the waste water tank 011. The air fryer is provided with an air outlet assembly 08 at one side of an upper part, and the air outlet assembly 08 is mounted with a rear water receiving box 07 at a lower end.

The bottom of the cooking cavity 2 is in a structure with high periphery and low middle part, and the cooking cavity drain port 09 is located in the middle part of the cooking cavity, so as to facilitate the accumulated water gathering towards the cooking cavity drain port 09.

The waste water tank 011 is provided with a visible window at one side, and through the visible window the water level of the waste water in the waste water tank 011 may be seen, thus facilitating cleaning.

The water-through connector 010 is a three-way connector, and may be in communication and connection with the cooking cavity drain port 09, the waste water outlet 14 and the waste water tank 011 simultaneously, which is quite convenient.

The water tank 19 includes a main water tank and a secondary water tank 6 mounted at a lower end of the main water tank. The secondary water tank 6 is provided with a waste water bin 11 at a lower end. The waste water bin 11 is provided with a waste water outlet 14 at one side. Most residual water may remain in the secondary water tank 6. The water tank 19 may be removed to exchange water, and the remaining waste water may automatically flow into the waste water bin 11, further ensuring the cleanness and sanitation in the secondary water tank 6.

The secondary water tank 6 is provided with an excess water drain port in an upper part, and this excess water drain port is in communication with the waste water tank 011 through a hose. When the water in the secondary water tank 6 is excessive, the water will automatically flow back into the waste water tank 011.

The rear water receiving box is made of a transparent material, and is detachably connected to the air outlet assembly, which facilitates observation and cleaning in time.

The waste water tank 011 and the air fryer are detachably connected, and specifically, similar to a drawer, the waste water tank 011 may be inserted in a manner of translation from one side of the air fryer at the bottom.

By the same reasoning, it can be seen that the structure of the present disclosure is simple, and the water remaining in the water tank may be discharged into the waste water tank to avoid the water in the water tank from being contaminated to affect the steam quality; the distilled water generated in the cooking cavity in the steam cooking process may be discharged into the water receiving box, so as to avoid the food from being soaked by the distilled water; the rear water receiving box provided below a steam outlet may collect condensate water generated by the steam discharged, thereby solving the problem of collecting the waste water inside the air fryer, which is safe and sanitary.

Figure 7:
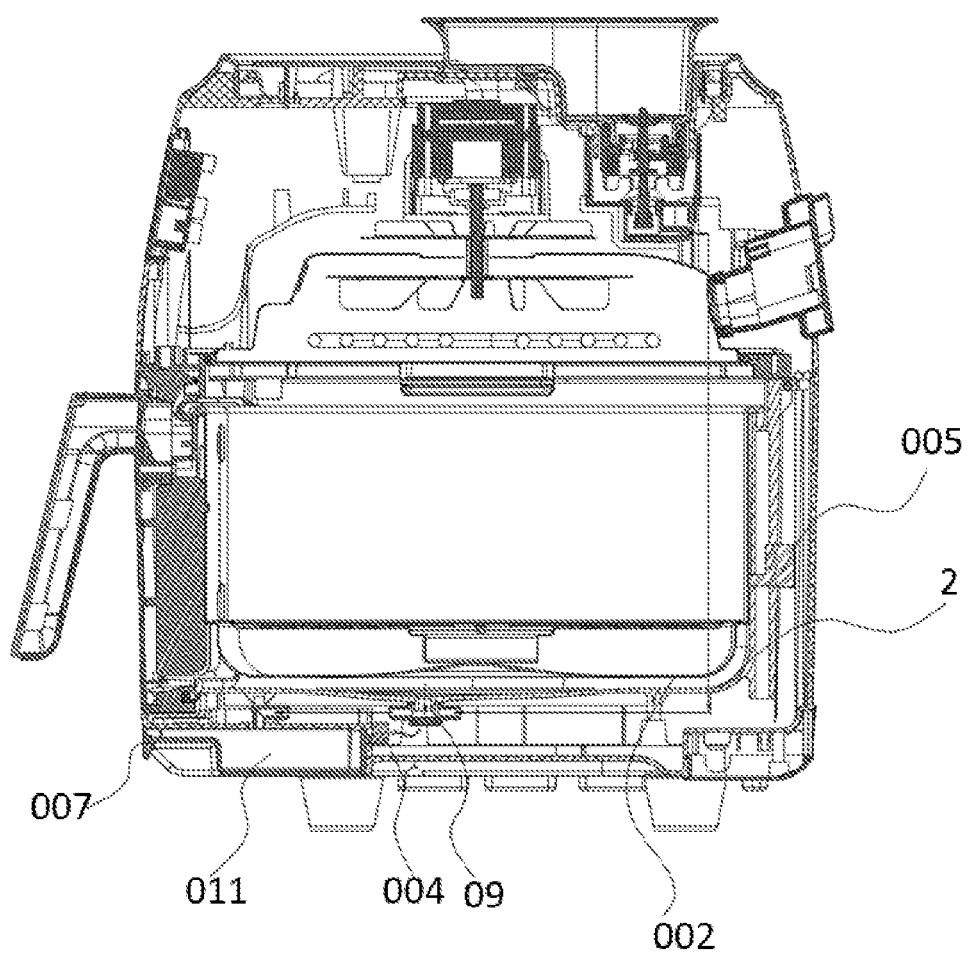
FIG. 7 is a front semi-sectional structural view of the steam-type air fryer provided in the present disclosure.

As shown in FIG. 7, in a condensate water recovery system of the air fryer having a steaming function provided in the present disclosure, the steam generation assembly and the cooking inner cavity 2 are provided in the shell of the air fryer, the cooking inner cavity 2 is provided with a steam inlet in communication with the steam generation assembly, the air fryer is provided with the waste water tank 011 at the bottom, the cooking inner cavity 2 is provided with the drain port 09 at a lower end, the bottom of the cooking inner cavity 2 is in a structure with high periphery and low middle part, and the drain port 09 is provided in the middle part of the bottom of the cooking inner cavity 2 and is in communication with the waste water tank 011.

The bottom of the cooking inner cavity 2 is in a structure with high periphery and low middle part, then condensate water in the cooking inner cavity 2 may automatically flow to the position of the drain port 09, and enter the waste water tank 011, thus realizing automatic collection.

In order to facilitate emptying the waste water in the waste water tank 011, the waste water tank 011 and the air fryer are detachably connected.

As an embodiment of a detachable structure of the waste water tank 011, an inner side of the bottom of the air fryer is provided with an inner chute, and the waste water tank 011 slides along the inner chute so as to realize detachment and mounting, in this way the mounting and detachment of the waste water tank 011 may be realized quickly.

In addition, the air fryer is mounted, at one side of the bottom, with a waste water tank detection sensor 004 which may detect whether the waste water tank is mounted in position, and which will issue a prompt if the waste water tank is not mounted in position, and the air fryer cannot be started.

In the above, the waste water tank 011 is provided with the visible window 007 at one side, and through the visible window the water level in the waste water tank 011 may be seen, so as to empty the waste water tank in time.

Likewise, a pot body detection sensor 005 is mounted inside the cooking inner cavity 2 at one side, and may detect whether an inner pot body 002 is placed in position.

Figure 8:
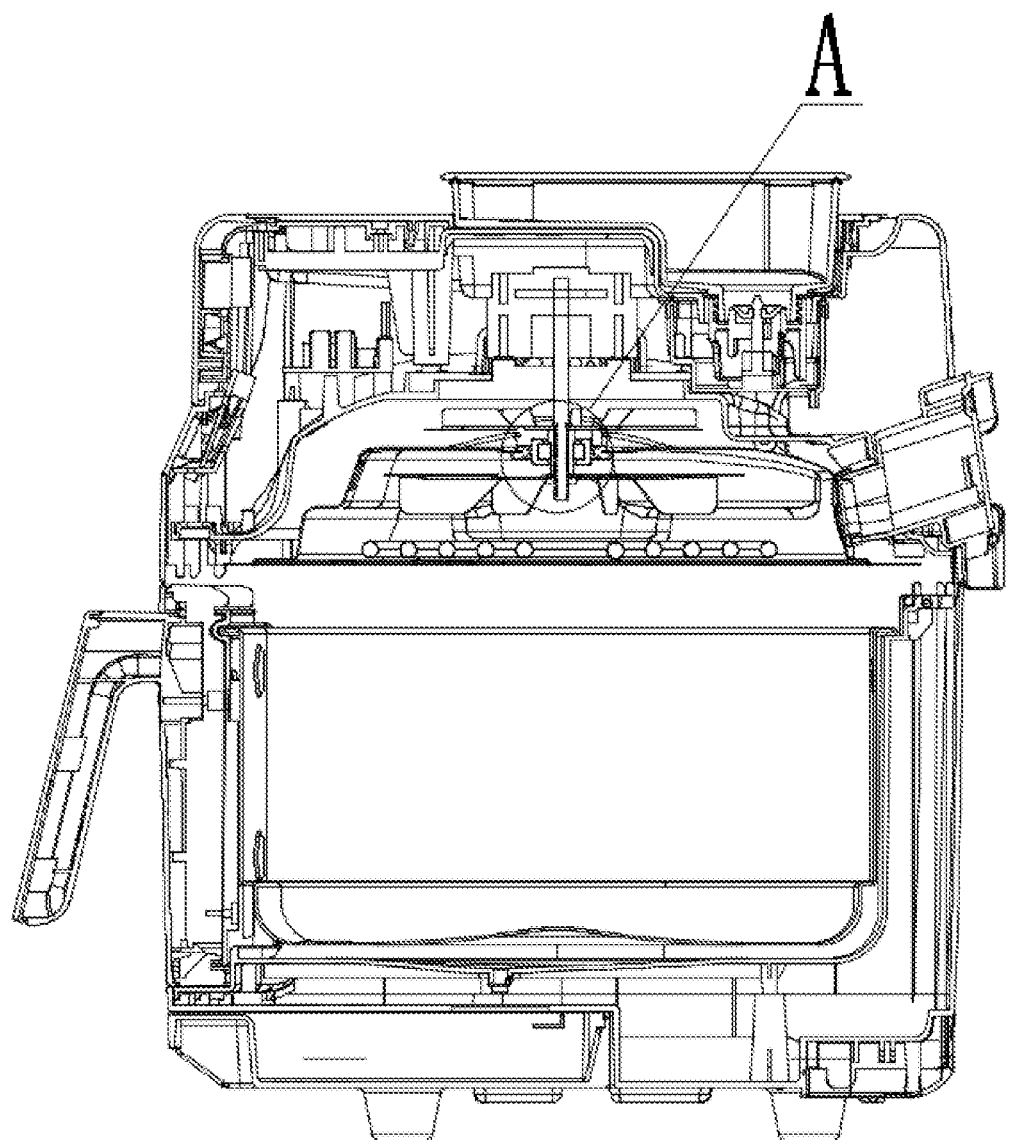
FIG. 8 is a front semi-sectional structural view of the steam-type air fryer provided in the present disclosure.
Figure 9:
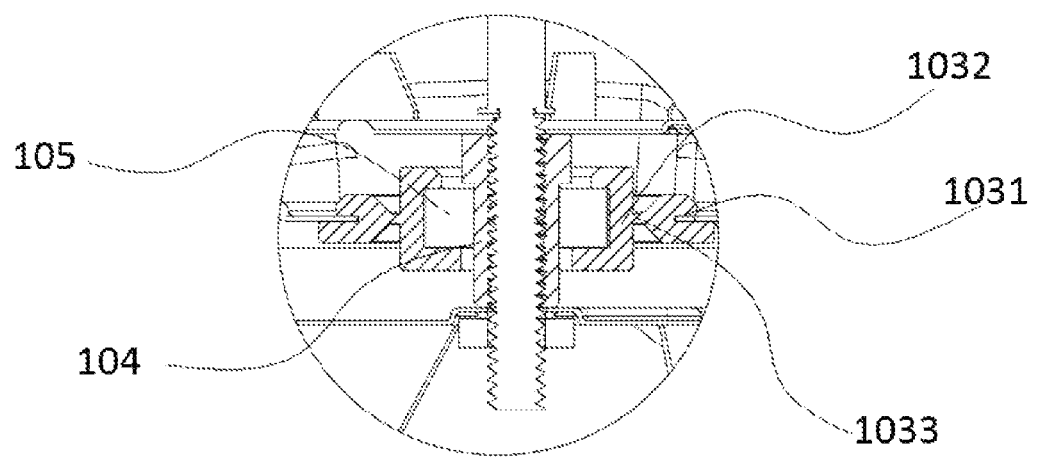
FIG. 9 is an enlarged structural view of a place A in FIG. 8.
Figure 10:
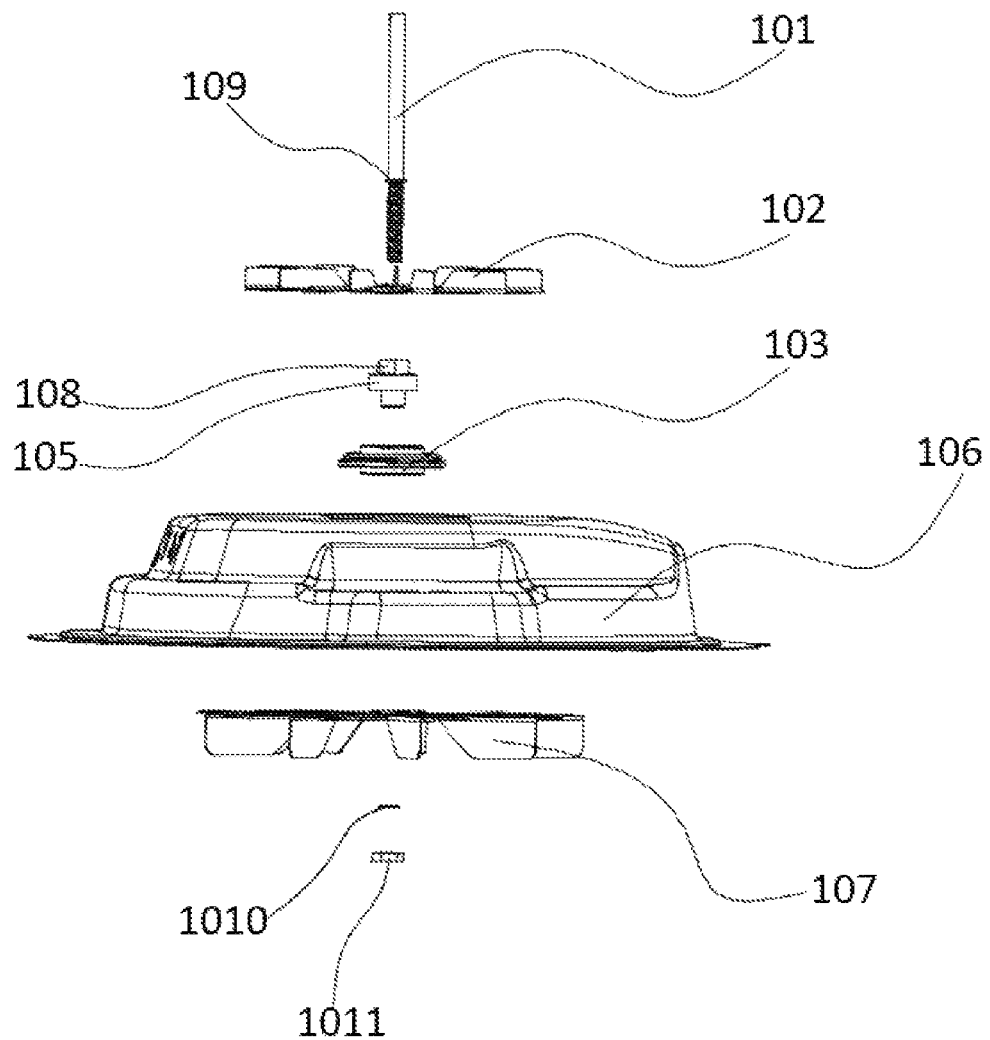
FIG. 10 is a partial perspective exploded structural view of the steam-type air fryer provided in the present disclosure.

As shown in FIGS. 8-10, the present disclosure provides an air fryer with good sealing property, including a sealing structure between a motor rotating shaft and an air duct plate, wherein the air fryer includes an air duct plate 106 and a motor rotating shaft 101 penetrating through a middle mounting hole of the air duct plate 106, the motor rotating shaft 101 is externally sheathed with a shaft sleeve 104, the shaft sleeve 104 is externally sheathed with a bearing 105, an outer ring of the bearing 105 is clamped into a flexible sleeve 103, the flexible sleeve 103 is clamped into the middle mounting hole of the air duct plate 106, then the mounting hole is completely blocked by the flexible sleeve 103, and there is no gap between the motor rotating shaft 101 and the bearing 105, and there is also no gap between the bearing 105 and the flexible sleeve 103, thus the oil smoke below the air duct plate 106 may be sufficiently prevented from entering the upper part of the air duct plate 106.

As an embodiment of the present disclosure, the flexible sleeve 103 is provided with a clamping groove 1031 at an outer side, the clamping groove 1031 is clamped with the air duct plate 106 directly, without other fasteners for mounting, which is quite convenient, and does not require high mounting accuracy, wherein the flexible sleeve 103 is provided with a middle sleeve 1032 in the middle, the bearing 105 is provided in the middle sleeve 1032, and the middle sleeve 1032 wraps the bearing 105, then the bearing 105 can be effectively positioned, and the sealing property of the flexible sleeve 103 can be improved.

A sheet connecting portion 1033 is provided between the middle sleeve 1032 and an edge of the flexible sleeve 103, and the sheet connecting portion 1033 may enhance the elasticity thereof, and may ensure an easier operation in the assembling process, and meanwhile, having better elasticity will not affect operation of a motor rotating shaft 101 in the operation process of the product.

In order to facilitate mounting and position adjustment of the shaft sleeve 104, the shaft sleeve 104 and the motor rotating shaft 101 adopt threaded connection therebetween, the shaft sleeve 104 is provided with a mounting operation portion 108 at an upper end, and the mounting operation portion 108 functions to make a tool have a force-bearing part so as to facilitate mounting the shaft sleeve 104. The mounting operation portion 108 is designed in a regular hexagonal shape, similar to structure of a nut.

In order to realize positioning of a cooling wind wheel 102 and a heat circulation wind wheel 107 with the shaft sleeve 104, the upper end of the shaft sleeve 104 abuts against the cooling wind wheel 102 at the upper side of the air duct plate 106, the lower end of the shaft sleeve 104 abuts against the heat circulation wind wheel 107 at the lower side of the air duct plate 106, then the cooling wind wheel 102 and the heat circulation wind wheel 107 may be positioned by the shaft sleeve 104 to facilitate assembling.

As a positioning embodiment of the cooling wind wheel 102 and the heat circulation wind wheel 107, the motor rotating shaft 101 at the upper side of the cooling wind wheel 102 is sheathed with a position-limiting part 109, the position-limiting part 109 and the shaft sleeve 104 together may clamp the cooling wind wheel 102, and the motor rotating shaft 101 at the lower side of the heat circulation wind wheel 107 is sheathed with a spacer 1010 and a nut 1011 in sequence, then the spacer 1010 and the nut 1011 can ensure the positioning and mounting of the heat circulation wind wheel 107.

Figure 11:
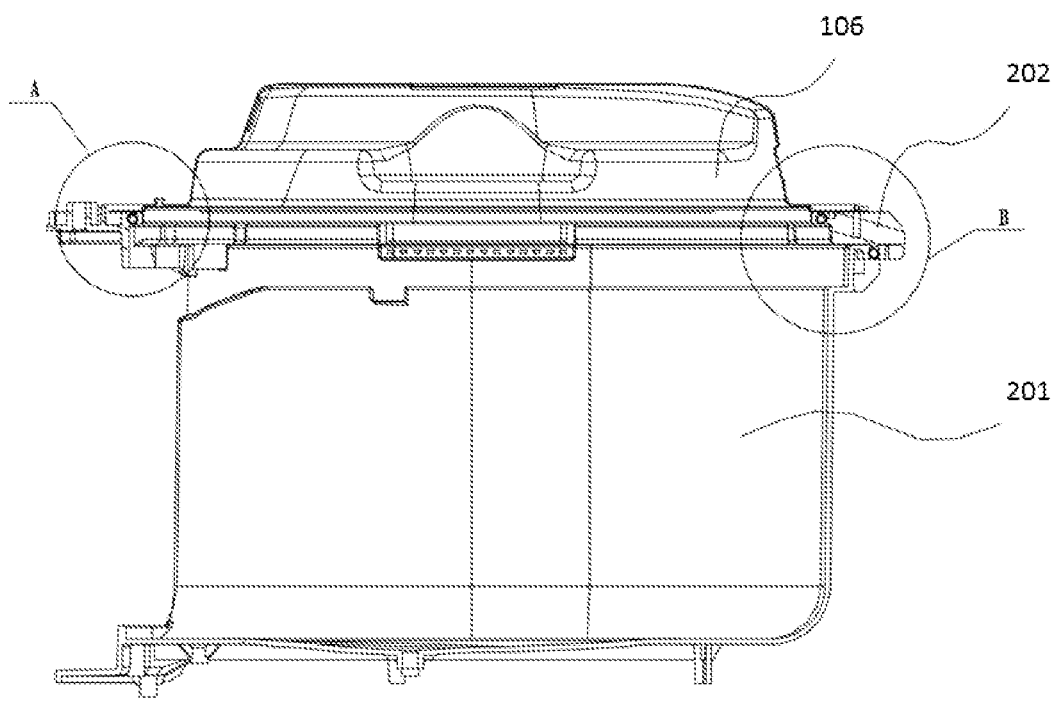
FIG. 11 is a partial semi-sectional structural view of the steam-type air fryer provided in the present disclosure.
Figure 12:
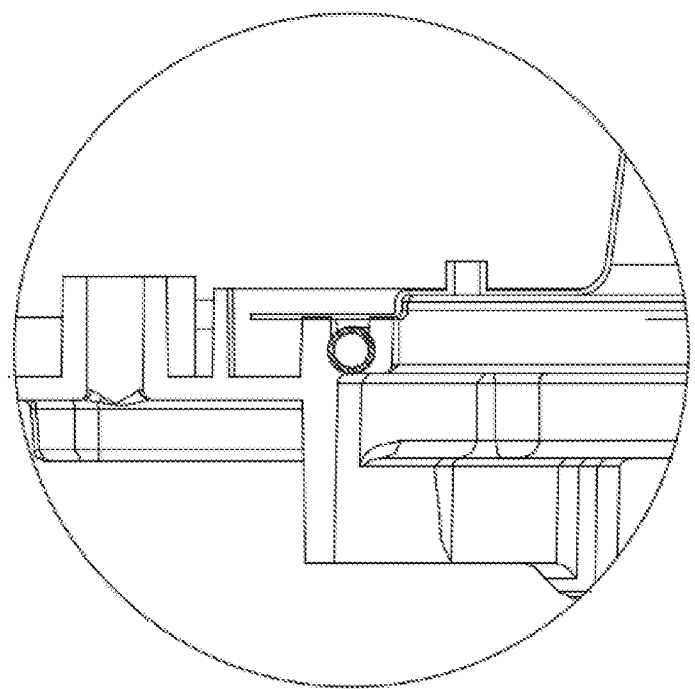
FIG. 12 is an enlarged structural view of a place A in FIG. 11.
Figure 13:
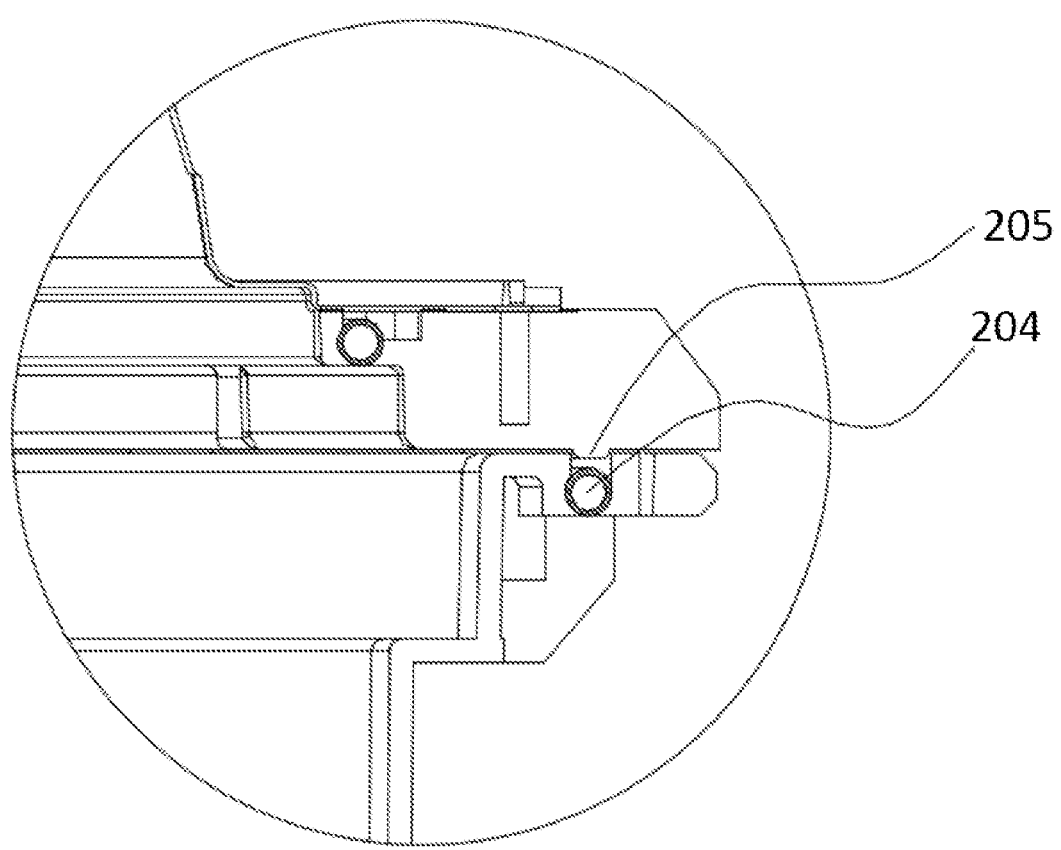
FIG. 13 is an enlarged structural view of a place B in FIG. 11.

As shown in FIGS. 11-13, the present disclosure provides a cooking cavity sealing structure of an air fryer having a steaming function, a steam generation assembly and a cooking cavity are provided in the shell of the air fryer, the cooking cavity is provided with a steam inlet in communication with the steam generation assembly, and the cooking cavity is formed by splicing at least two parts, and a sealing structure is provided at a splicing position.

As an embodiment of the present disclosure, the cooking cavity includes a lower core 201, a bracket 202 located at an upper end of the lower core 201 and an air duct plate 106 located at an upper end of the bracket 202, and a sealing structure is provided among the lower core 201, the bracket 202 and the air duct plate 106, in this way, both splicing positions may be sealed, and the steam in the cooking cavity is prevented from leaking outwards.

Specifically, the sealing structure includes a sealing member and a compression structure, upper end edge positions of the lower core 201 and the bracket 202 are each provided with a sealing groove, the sealing member is provided in the sealing grooves, and the compression structure is provided at a lower end of the bracket 202 and/or a lower end of the air duct plate 106 to press against the sealing member.

As another embodiment of the present disclosure, the cooking cavity includes a lower core 201 and an air duct plate 106 located at an upper side of the lower core 201, and a sealing structure is provided between the lower core 201 and the air duct plate 106. By the same reasoning, a sealing groove is provided at an upper end of the lower core 201, the sealing member is provided in the sealing groove, and the compression structure is provided at the lower end of the air duct plate 106 to press against the sealing member, which likewise may effectively prevent the steam in the cooking cavity from leaking outwards.

In the above, the compression structure in the above embodiment is a convex pressing strip 205, and the convex pressing strip 205 is correspondingly pressed against the sealing member, thereby ensuring that any position of the sealing member will be tightly compressed, and ensuring the sealing property.

In addition, the sealing member in the above embodiment is a silicone sealing ring 204. The silicone sealing ring 204 is relatively common, with a relatively low cost, and relatively convenient to replace.

Preferably, the silicone sealing ring 204 is a hollow silicone sealing ring. The hollow silicone sealing ring has very good elasticity and a long service life.

It can be seen that the present disclosure has a simple structure, and may ensure the sealing property between components constituting the cooking inner cavity of the air fryer, avoid steam leakage, with a reasonable sealing structure, and improve the sealing property by providing the compression structure.

Figure 14:
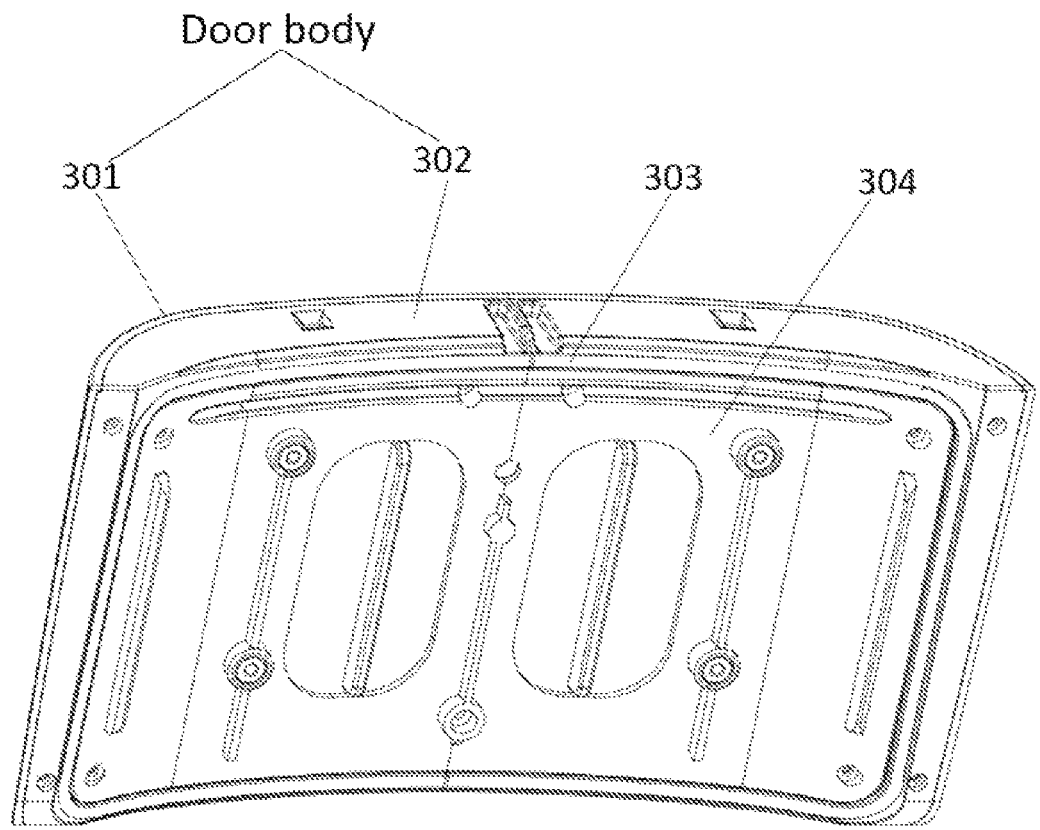
FIG. 14 is a schematic structural view of a door body of the steam-type air fryer provided in the present disclosure.
Figure 15:
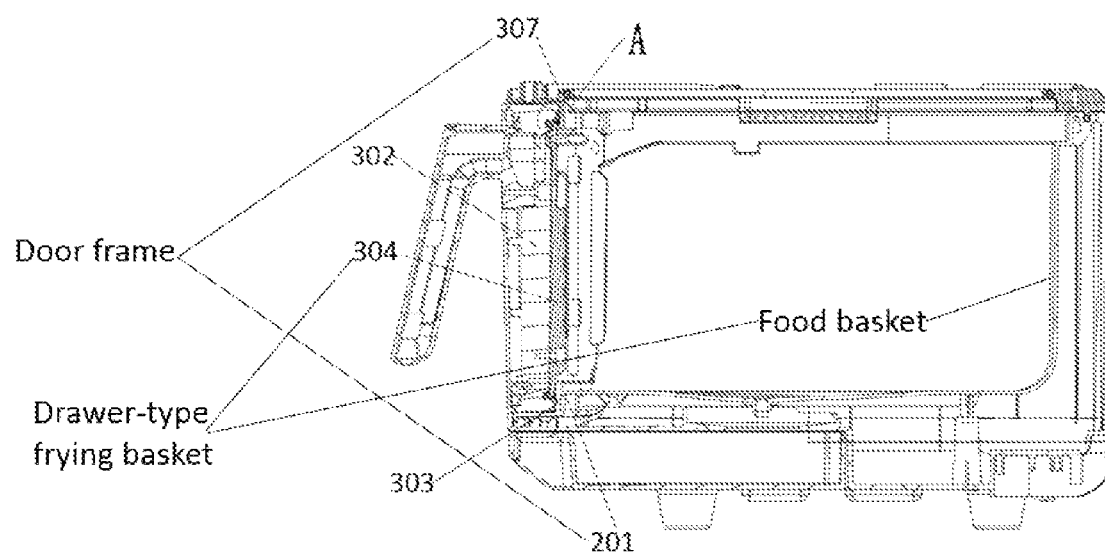
FIG. 15 is a partial semi-sectional structural view of the steam-type air fryer provided in the present disclosure.
Figure 16:
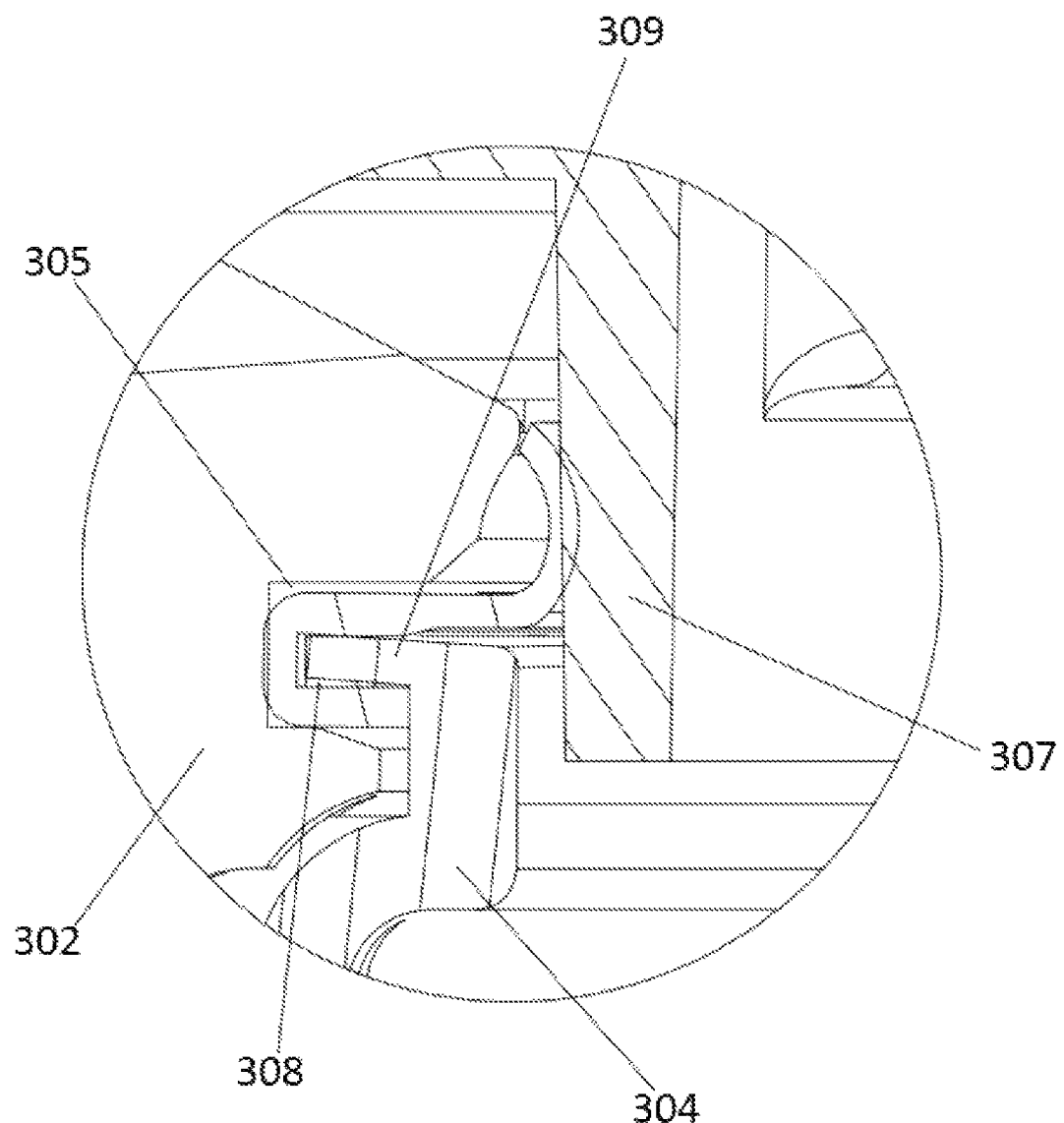
FIG. 16 is a partial enlarged view of a place A in FIG. 15.

As shown in FIGS. 14-16, the present disclosure provides a door panel sealing structure of an air fryer having a steaming function, which mainly adds a mounting groove 305 on a door panel core 302, a silicone ring is placed in the mounting groove and compressed by a cover plate 304; when the entire door panel assembly (including the pot body) is placed in the frying pot, the silicone ring is in close contact with a door frame of the frying pot (the door frame of the frying pot is formed by the lower core 201 and a core bracket 307 in cooperation), thereby preventing overflow of hot air and water steam, and realizing the sealing effect.

An inner side of the door panel core 302 is provided with a mounting groove 305 in an annular shape around an edge of the cover plate 304. One end of a sealing ring 303 extends into the mounting groove 305 and is tightly compressed by the cover plate 304, and the other end of the sealing ring 303 extends out of the mounting groove 305 and is curved outwards in an arc shape. One end of the sealing ring 303 extending out of the mounting groove 305 is a sealing tongue portion, and the sealing tongue portion is sealed against the door frame.

One end of the sealing ring 303 extending into the mounting groove 305 is provided with a positioning groove 308 at the side thereof close to the cover plate 304, and the cover plate 304 is provided with a flange 309 extending into the positioning groove 308. One end of the sealing ring 303 extending into the mounting groove 305 is a fixing portion, and the positioning groove 308 in the fixing portion is fitted with the flange 309 on the cover plate 304, then the sealing ring 303 can be effectively positioned and tightly compressed, thereby reducing the shaking of the sealing ring 303.

The sealing ring 303 may be made of a silicone material or other sealing materials.

Although the present disclosure has been described above with reference to the embodiments, various improvements may be made to the present disclosure and components therein may be replaced by equivalents, without departing from the scope of the present disclosure. Particularly, all of various features in the embodiments disclosed in the present disclosure may be used in combination with each in any manner as long as there is no structural conflict, while these combinations are not exhaustively described in the present description only for reasons of space omission and resource saving. Therefore, the present disclosure is not restricted to specific embodiments disclosed herein, but covers all technical solutions falling within the scope of the claims.

INDUSTRIAL APPLICABILITY

The drain structure of the steam-type air fryer provided in the present disclosure has a simple and unique structure, the water tank needs to be removed, and the water tank nut needs to be unscrewed to add water, which effectively prevents the risk of water overflow, and prevents water from flowing into the control cavity when adding water which affects the service life of the electric device. The water tank nut has a certain height, and when the liquid level of the secondary water tank is increased to this height, air cannot enter the water tank, thus forming the liquid sealing effect, the interior of the water tank is in a negative pressure, then the water no longer falls into the secondary water tank, and the liquid level of the secondary water tank is no longer increased, therefore the sealing effect is good; the ejector rod and the water tank rod cooperate with each other to realize the automatic drain and automatic sealing of the water tank, and also have a function of cleaning waste water to prevent waste water from remaining; the water remaining in the water tank may be discharged into the waste water tank to avoid the water in the water tank from being contaminated to affect the steam quality; the distilled water generated in the cooking cavity in the steam cooking process may be discharged into the water receiving box, so as to avoid the food from being soaked by the distilled water; the rear water receiving box provided below the steam outlet may collect the condensate water generated by the steam discharged, thereby solving the problem of collecting the waste water inside the air fryer, which is safe and sanitary; moreover, the bottom wall of the inner cavity of the cooking cavity is in a structure with high periphery and low middle part, then the condensate water will gather toward the middle of the bottom wall of the inner cavity, and flow into the waste water tank through a condensate water outlet in the middle, then the food will not be soaked by the accumulated water and the mouthfeel will not be affected. The water level of the waste water tank is visible, facilitating the user in observing and cleaning the waste water tank in time, thus functioning to detect whether the waste water tank is mounted or not, and avoiding the situation that the air fryer is used without mounting the waste water tank, thereby improving the user's use experience.

The sealing structure between the motor rotating shaft and the air duct plate of the steam-type air fryer provided in the present disclosure realizes the sealing against the mounting hole of the air duct plate by adopting the combination of the shaft sleeve, the bearing and the flexible sleeve. The flexible sleeve has certain elasticity, may be deformed and easily assembled, and may ensure that the assembling will not be affected even if an assembling error exists, moreover, vibration of motor rotating shaft fan and the like will not affect the sealing, either; and the shaft sleeve further may position the positions of the cooling wind wheel and the heat circulation wind wheel, thus facilitating the assembling.

The cooking cavity sealing structure of the steam-type air fryer provided in the present disclosure has a simple structure, and may ensure the sealing property among the components constituting the cooking inner cavity of the air fryer, avoid steam leakage, with a reasonable sealing structure, and improve the sealing property by providing the compression structure.

For the door panel sealing structure of the steam-type air fryer provided in the present disclosure, the mounting groove is added on the door panel core, and the sealing ring is placed in the mounting groove and pressed by the cover plate; when the entire door panel assembly (including the pot body) is placed in the frying pot, the sealing ring is in close contact with the door frame of the frying pot, thereby preventing overflow of hot air and water steam, and realizing the sealing effect; one end of the sealing ring extending out of the mounting groove is a sealing tongue portion, and the sealing tongue portion is sealed against the door frame; one end of the sealing ring extending into the mounting groove is a fixing portion, and the positioning groove in the fixing portion is fitted with the flange on the cover plate, then the sealing ring can be effectively positioned and tightly compressed, thereby reducing the shaking of the sealing ring.

What is claimed is:

1. A steam-type air fryer, comprising a shell, a cooking cavity located at a lower side of an interior of the shell and a control cavity located at an upper side of the interior of the shell, wherein the control cavity is provided therein with a control panel and a drive motor, and an upper side of the shell is provided with a vent in communication with the control cavity, wherein a top portion of the shell is provided with a water tank, the shell is provided therein with a steam generator in communication with the water tank, the steam generator is configured to input steam into the cooking cavity, the water tank is in a structure having an opened bottom and a closed top, and the water tank is detachably mounted on the shell, wherein a secondary water tank is provided at a bottom opening of the water tank, the bottom opening of the water tank is detachably connected with a water tank nut extending into the secondary water tank, a water tank rod configured to be lifted up and down is provided at a middle part of the water tank nut, an upper end of the water tank rod is sheathed with a water tank sealing piece configured to block a middle through hole of the water tank nut, a bottom of the secondary water tank is vertically provided with an ejector rod corresponding to the water tank rod, wherein when the ejector rod is against the water tank rod, the water tank sealing piece unblocks the middle through hole, and when the water tank rod is separated from the ejector rod, the water tank sealing piece blocks the middle through hole; and a water outlet of the secondary water tank is in communication with the steam generator.

2. The steam-type air fryer according to claim 1, wherein a lower end of the secondary water tank is provided with a waste water bin in communication with a drain hole at a bottom of the secondary water tank, the ejector rod is vertically inserted from the drain hole and is externally sheathed with a spring against a bottom of the waste water bin, the ejector rod is externally sheathed with a waste water sealing piece configured to block the drain hole, wherein when the water tank rod is against the ejector rod, the waste water sealing piece blocks the drain hole, and when the water tank rod is separated from the ejector rod, the waste water sealing piece unblocks the drain hole.

3. The steam-type air fryer according to claim 2, wherein a waste water outlet is provided at one side of the waste water bin, and a bottom surface of the waste water bin is an inclined surface inclined towards the waste water outlet.

4. The steam-type air fryer according to claim 1, wherein a lower end surface of the water tank nut is provided with several concave notches in a circumferential direction.

5. The steam-type air fryer according to claim 1, wherein a nut sealing ring is embedded between an upper end of the water tank nut and the water tank, and an upper end of the water tank is mounted with a water tank upper cover in a sealing manner.

6. The steam-type air fryer according to claim 1, wherein a waste water tank is mounted at a bottom of the air fryer, a cooking cavity drain port at a lower end of the cooking cavity is in communication with the waste water tank, and a waste water outlet at a lower end of the water tank is in communication with the waste water tank.

7. The steam-type air fryer according to claim 6, wherein a lower end of the cooking cavity drain port is mounted with a water-through connector in communication therewith, the waste water outlet of the water tank is connected to the water-through connector through a water pipe, and the water-through connector is in communication with the waste water tank.

8. The steam-type air fryer according to claim 1, wherein an air outlet assembly is provided at one side of an upper part of the air fryer, and a lower end of the air outlet assembly is mounted with a rear water receiving box.

9. The steam-type air fryer according to claim 6, wherein a bottom of the cooking cavity is in a structure with high periphery and low middle part, and the cooking cavity drain port is provided in a middle part of the bottom of the cooking cavity and is in communication with the waste water tank.

10. The steam-type air fryer according to claim 6, wherein the waste water tank and the air fryer are detachably connected to each other.

11. The steam-type air fryer according to claim 10, wherein a visible window is provided at one side of the waste water tank, or the waste water tank is made of a transparent material.

12. The steam-type air fryer according to claim 1, wherein the air fryer further comprises an air duct plate and a motor rotating shaft penetrating through a middle mounting hole of the air duct plate, wherein the motor rotating shaft is externally sheathed with a shaft sleeve, the shaft sleeve is externally sheathed with a bearing, an outer ring of the bearing is hermetically clamped into a flexible sleeve, and the flexible sleeve is hermetically clamped into the middle mounting hole of the air duct plate.

13. The steam-type air fryer according to claim 12, wherein a clamping groove is provided at an outer side of the flexible sleeve, and the clamping groove is clamped with the air duct plate.

14. The steam-type air fryer according to claim 13, wherein a middle sleeve is provided in a middle of the flexible sleeve, the bearing is provided in the middle sleeve, and a sheet connecting portion is provided between the middle sleeve and an edge of the flexible sleeve.

15. The steam-type air fryer according to claim 14, wherein an upper end of the shaft sleeve abuts against a cooling wind wheel at an upper side of the air duct plate, and a lower end of the shaft sleeve abuts against a heat circulation wind wheel at a lower side of the air duct plate.

16. The steam-type air fryer according to claim 15, wherein the motor rotating shaft at an upper side of the cooling wind wheel is sheathed with a position-limiting part, and the motor rotating shaft at a lower side of the heat circulation wind wheel is sheathed with a spacer and a nut in sequence.

17. The steam-type air fryer according to claim 1, wherein the cooking cavity comprises a lower core, a bracket located at an upper end of the lower core and an air duct plate located at an upper end of the bracket, wherein a sealing structure is provided among the lower core, the bracket and the air duct plate.

18. The steam-type air fryer according to claim 1, wherein the shell of the air fryer is provided with a door frame opened towards one side, the door frame is in communication with the cooking cavity, a door body configured to be capable of opening or closing the door frame is provided at the door frame, one side of the door body facing the door frame is provided with a sealing ring, and the sealing ring is hermetically fitted with the door frame.

19. The steam-type air fryer according to claim 18, wherein a drawer-type frying basket is provided at the door frame, the drawer-type frying basket comprises a food basket and a door panel core located at one side of the food basket, and the door panel core is provided with the sealing ring.

\* \* \* \* \*